US012623969B2

(12) United States Patent
Said et al.

(10) Patent No.: US 12,623,969 B2
(45) Date of Patent: May 12, 2026

(54) PROCESS FOR COLD SINTERING OF CALCIUM CARBONATE FOR PRECAST CONSTRUCTION MATERIALS

(71) Applicant: The Penn State Research Foundation, University Park, PA (US)

(72) Inventors: Aly Said, University Park, PA (US); Mehrzad Zahabi, Boston, MA (US); Ali Memari, State College, PA (US)

(73) Assignee: The Penn State Research Foundation

( * ) Notice: Subject to any disclaimer, the term of this patent is extended or adjusted under 35 U.S.C. 154(b) by 720 days.

(21) Appl. No.: 17/907,477

(22) PCT Filed: Jul. 15, 2021

(86) PCT No.: PCT/US2021/041856
§ 371 (c)(1),
(2) Date: Sep. 27, 2022

(87) PCT Pub. No.: WO2022/035552
PCT Pub. Date: Feb. 17, 2022

(65) Prior Publication Data

US 2023/0150883 A1 May 18, 2023

Related U.S. Application Data

(60) Provisional application No. 62/706,352, filed on Aug. 11, 2020.

(51) Int. Cl.

| | |
|---|---|
| ***C04B 35/057*** | (2006.01) |
| ***C04B 35/63*** | (2006.01) |
| ***C04B 35/645*** | (2006.01) |

(52) U.S. Cl.
CPC ........ *C04B 35/057* (2013.01); *C04B 35/6303* (2013.01); *C04B 35/645* (2013.01); *C04B 2235/3208* (2013.01); *C04B 2235/5463* (2013.01); *C04B 2235/96* (2013.01)

(58) Field of Classification Search
CPC . C04B 35/057; C04B 35/6303; C04B 35/645; C04B 2235/3208; C04B 2235/5463; C04B 2235/96
USPC .......................................................... 264/239
See application file for complete search history.

(56) References Cited

U.S. PATENT DOCUMENTS

| | | | |
|---|---|---|---|
| 5,187,125 | A | 2/1993 | Someya et al. |
| 2019/0248870 | A1 | 8/2019 | Bouville |

FOREIGN PATENT DOCUMENTS

| | | | |
|---|---|---|---|
| RU | 2378215 C1 | 1/2010 | |
| RU | 2281199 C2 | 8/2016 | |
| WO | 2020146738 A1 | 7/2020 | |

OTHER PUBLICATIONS

International Search Report and Written Opinion for PCT/US2021/041856 filed Jul. 15, 2021, dated Oct. 21, 2021.

*Primary Examiner* — Christina A Johnson
*Assistant Examiner* — Xue H Liu
(74) *Attorney, Agent, or Firm* — BUCHANAN INGERSOLL & ROONEY PC

(57) ABSTRACT

Embodiments relate to use of a solution having low molarity to form a mixture with a ceramic compound that will facilitate formation of a sintered ceramic compact exhibiting grain boundary formation, low porosity, adequate compressive strength, and adequate hardness to be used as a precast block 108 for cement.

18 Claims, 48 Drawing Sheets

Figure 1:
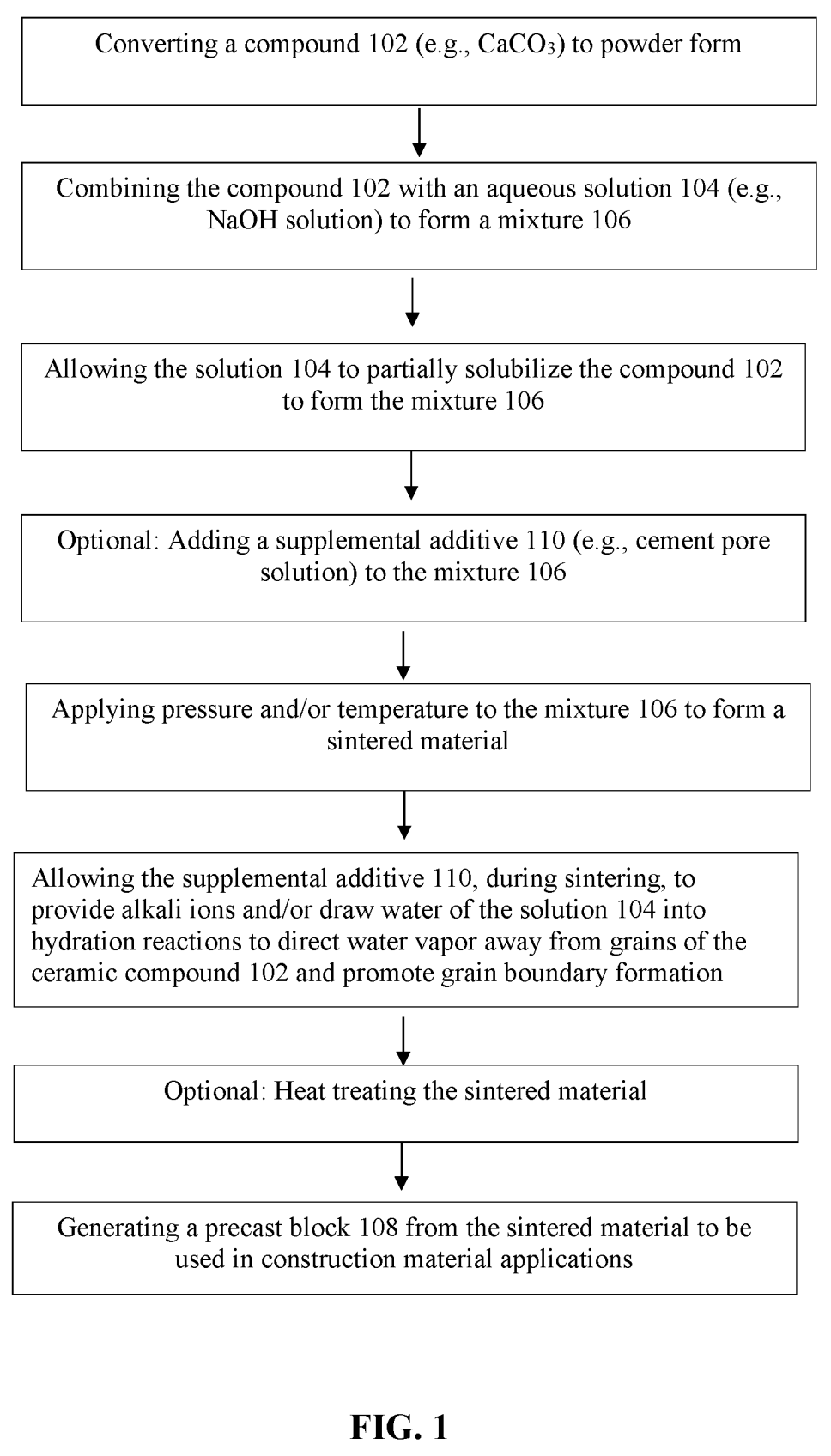

Converting a compound 102 (e.g., $CaCO_3$) to powder form

↓

Combining the compound 102 with an aqueous solution 104 (e.g., NaOH solution) to form a mixture 106

↓

Allowing the solution 104 to partially solubilize the compound 102 to form the mixture 106

↓

Optional: Adding a supplemental additive 110 (e.g., cement pore solution) to the mixture 106

↓

Applying pressure and/or temperature to the mixture 106 to form a sintered material

↓

Allowing the supplemental additive 110, during sintering, to provide alkali ions and/or draw water of the solution 104 into hydration reactions to direct water vapor away from grains of the ceramic compound 102 and promote grain boundary formation

↓

Optional: Heat treating the sintered material

↓

Generating a precast block 108 from the sintered material to be used in construction material applications

FIG. 1 picture taken after shaking of tubes picture taken after 16 hours

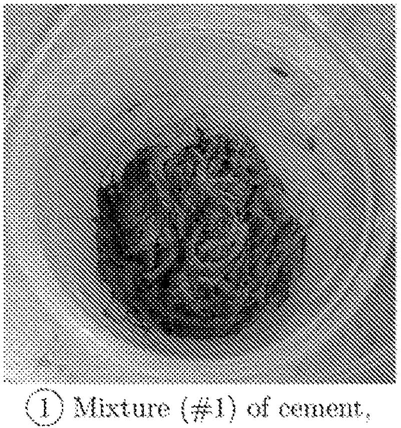
(1) Mixture (#1) of cement, water, superplasticizer, and fiber
(2) Mixture #1 added to mixture of $CaCO_3$, NaCl, and water
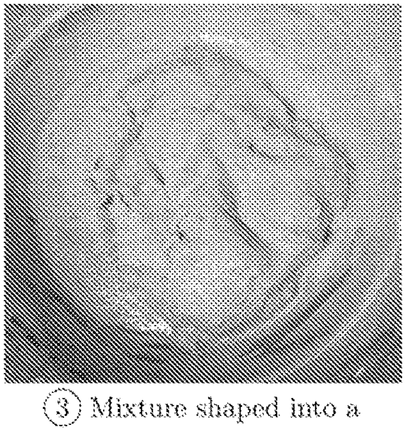
(3) Mixture shaped into a doughy consistency
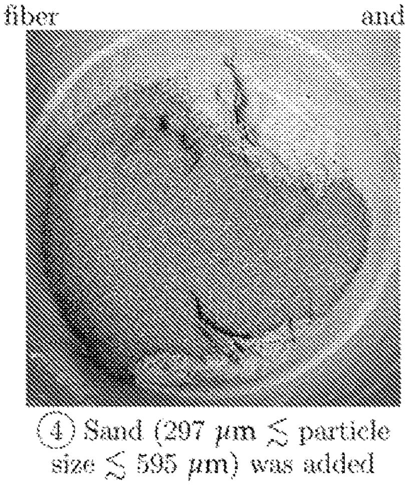
(4) Sand (297 $\mu m \lesssim$ particle size $\lesssim$ 595 $\mu m$) was added and mixed
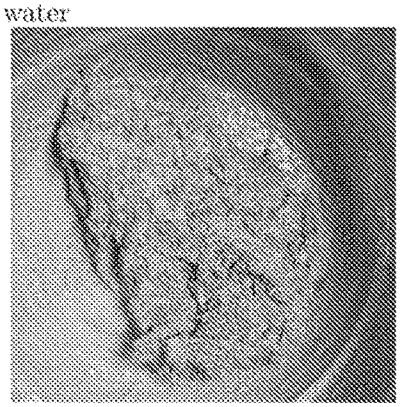
(5) Final mix for placement into the mold
FIG. 5

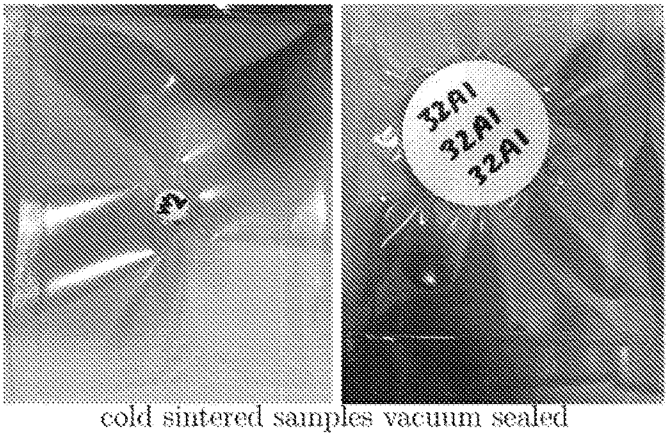
cold sintered samples vacuum sealed
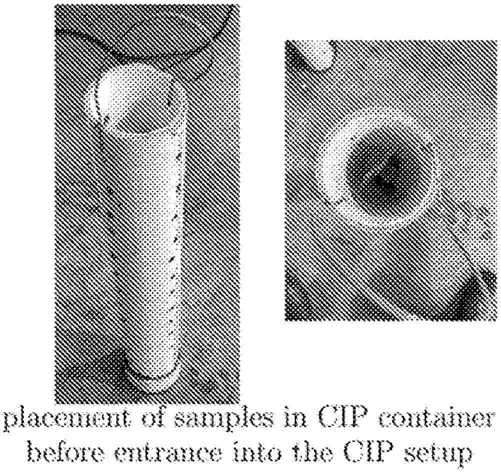
placement of samples in CIP container
before entrance into the CIP setup
FIG. 15 uncoated precipitate $CaCO_3$ (Brilliant 1500 with average particle size of 150 nm)

$$\underset{\text{solid}}{CaCO_3} + \underset{\text{aqueous}}{2\,NaOH} \rightleftharpoons \underset{\text{aqueous}}{Ca(OH)_2} + \underset{\text{aqueous}}{Na_2CO_3}$$

reaction is driven to the right at high temperatures superplasticizer:NaOH solution:PCC mixture mass ratio was 0:0.5:1 effectiveness of NaOH in sintering of $CaCO_3$ $$\underset{solid}{CaCO_3} + 2\,\underset{liquid}{CH_3COOH} \longrightarrow \underset{solid}{Ca(CH_3COO)_2} + \underset{gas}{CO_2} + H_2O$$

reaction takes place easily at room temperature
and mostly during mixing stage superplasticizer:acetic
acid solution:PCC
mixture mass ratio was
0.05:0.22:1 uncoated ground $CaCO_3$ (Whiton P-30)

superplasticizer:NaOH solution:GCC mixture mass ratio was 0:0.25:1

Sigma-Aldrich ReagentPlus® 99.9% ZnO - particle size < 5 $\mu m$ superplasticizer:acetic acid solution:ZnO mixture mass ratio was 0:0.2:1 superplasticizer:acetic acid solution:NaCl solution:ZnO+$CaCO_3$
mixture mass ratio was 0.02:0.06:0.14:1 superplasticizer:NaOH solution:silica fume mixture mass ratio was 0:0.4:1 effectiveness of NaOH in partial sintering of silica fume

| Sample | BET Surface Area ($\frac{m^2}{g}$) | t-Plot External Surface Area ($\frac{m^2}{g}$) | BJH Adsorption cumulative surface area ($\frac{m^2}{g}$) of pores[a] | BJH Desorption cumulative surface area ($\frac{m^2}{g}$) of pores[a] |
|---|---|---|---|---|
| 1 | 2.49 | 2.12 | 2.20 | 2.41 |
| 2 | 1.25 | 1.39 | 0.98 | 1.14 |
| 3 | 1.18 | 1.63 | 0.93 | 1.13 |
| 4 | 1.51 | 1.48 | 1.37 | 1.79 |

[a] pore widths between 17 Å and 3000 Å.

Table 1

| Mix Label | Cement Pre-Mix | | | | NaCl \| NaOH Molarity | Water (or Additional Water) | Non-Cementitious Solid | Sand | Mix Procedure |
|---|---|---|---|---|---|---|---|---|---|
| | Cement | Water | SP | Fiber | | | Type-Ratio | | |
| Densified-$CaCO_3$ | - | - | - | - | 1.0M-NaOH | 0.267 | S1[a]-1.0 | - | Note[b] |
| Densified-$CaCO_3$-Fiber | - | - | 0.02 | 0.036 | 0.5M-NaCl | 0.2 | S1[a]-1.0 | - | Note[b] |
| Densified-Mortar-28Day | 0.2 | 0.1 | 0.02[d] | 0.036[d] | 0.5M-NaCl | 0.2 | S1[a]-1.0 | 0.6[c] | Note[e] |
| OPC-Mortar-28Day | 1.0 | 0.5 | - | - | - | - | - | 2.5[c] | Note[f] |

[a] S1: Shiraishi Whiton P-30 (ground $CaCO_3$). [b] Non-cementitious solid was added to the aqueous solution and ground. [c] Angular dolomitic normal-weight sand; particle size between sieves #30 and #50. (297 $\mu$m $\lesssim$ particle size $\lesssim$ 595 $\mu$m). [d] Added to cement mix first.
[e] $CaCO_3$, NaCl and water were added together originally and ground using mortar and pestle. Additional water, superplasticizer (SP), fiber and cement were mixed and added to originial mixture and shaped into a doughy consistency. Sand was added and mixed (FIG. 5).
[f] Not a sintered/densified sample. Water and cement were mixed with a high-shear mixer for 5 minutes at 400 rpm. Sand was added and mixed.

FIG. 43

Table 2

| Mix Label | Cement Pre-Mix | | | Acetic Acid Molarity | NaCl \| NaOH Molarity | Water (or Additional Water) | Non-Cementitious Solid | Mix Procedure |
|---|---|---|---|---|---|---|---|---|
| | Cement | Water | SP | | | Ratio | Type-Ratio | |
| [L] Densified GCC-NaCl | 0 | 0 | - | - | 0.5M-NaCl | 0.2 | S1[a]-1.0 | Note[b] |
| [S] Densified GCC-NaCl | 0 | 0 | - | - | 0.5M-NaCl | 0.2 | S1[a]-1.0 | Note[b] |
| [S] Densified GCC-NaOH | 0 | 0 | - | - | 1.0M-NaOH | 0.267 | S1[a]-1.0 | Note[b] |
| [S] Densified PCC-NaOH | 0 | 0 | - | - | 1.0M-NaOH | 0.5 | S2[a]-1.0 | Note[b] |
| [S] 12-Hour Densified PCC(57%) \| Cement(43%) | 0.75 | - | - | - | 1.0M-NaOH | 0.75 | S2[a]-1.0 | Note[c] |
| [L] 42-Day Densified GCC(83.3%) \| Cement(16.7%) | 0.2 | 0.1 | 0.02[d] | - | 0.5M-NaCl | 0.2 | S1[a]-1.0 | Note[e] |
| 14-Day Cement Paste | 1 | 0.4 | - | - | - | - | - | Note[f] |
| 42-Day Cement Paste | 1 | 0.25 | 0.016[d] | - | - | - | - | Note[f] |
| [S] Densified ZnO | - | - | - | 1.0M | - | 0.28 | S3[a]-1.0 | Note[b] |
| [S] Densified SF | - | - | - | - | - | 0.4 | S4[a]-1.0 | Note[b] |
| [S] Densified SF-NaOH | - | - | - | 1.0M | - | 0.4 | S4[a]-1.0 | Note[b] |

[a] S1: Shiraishi Whiton P-30 (GCC) S2: Shiraishi Brilliant 1500 (PCC) S3: Sigma-Aldrich ZnO $< 5\ \mu m$ S4: BASF MasterLife SF 100 silica fume.
[b] Non-cementitious solid was added to the aqueous solution and ground using mortar and pestle.
[c] Non-cementitious solid was added to the aqueous solution and ground using mortar and pestle. Cement was added and further ground. [d] Added to cement mix first. [e] GCC, NaCl and water were added together originally and ground using mortar and pestle. Additional water, superplasticizer (SP) and cement were mixed and added to originial mixture and mixed with a high-shear mixer for 5 minutes at 1800 rpm. [f] Not a sintered/densified sample. Water, superplasticizer and cement were mixed with a high-shear mixer for 5 minutes at 1800 rpm.

FIG. 44

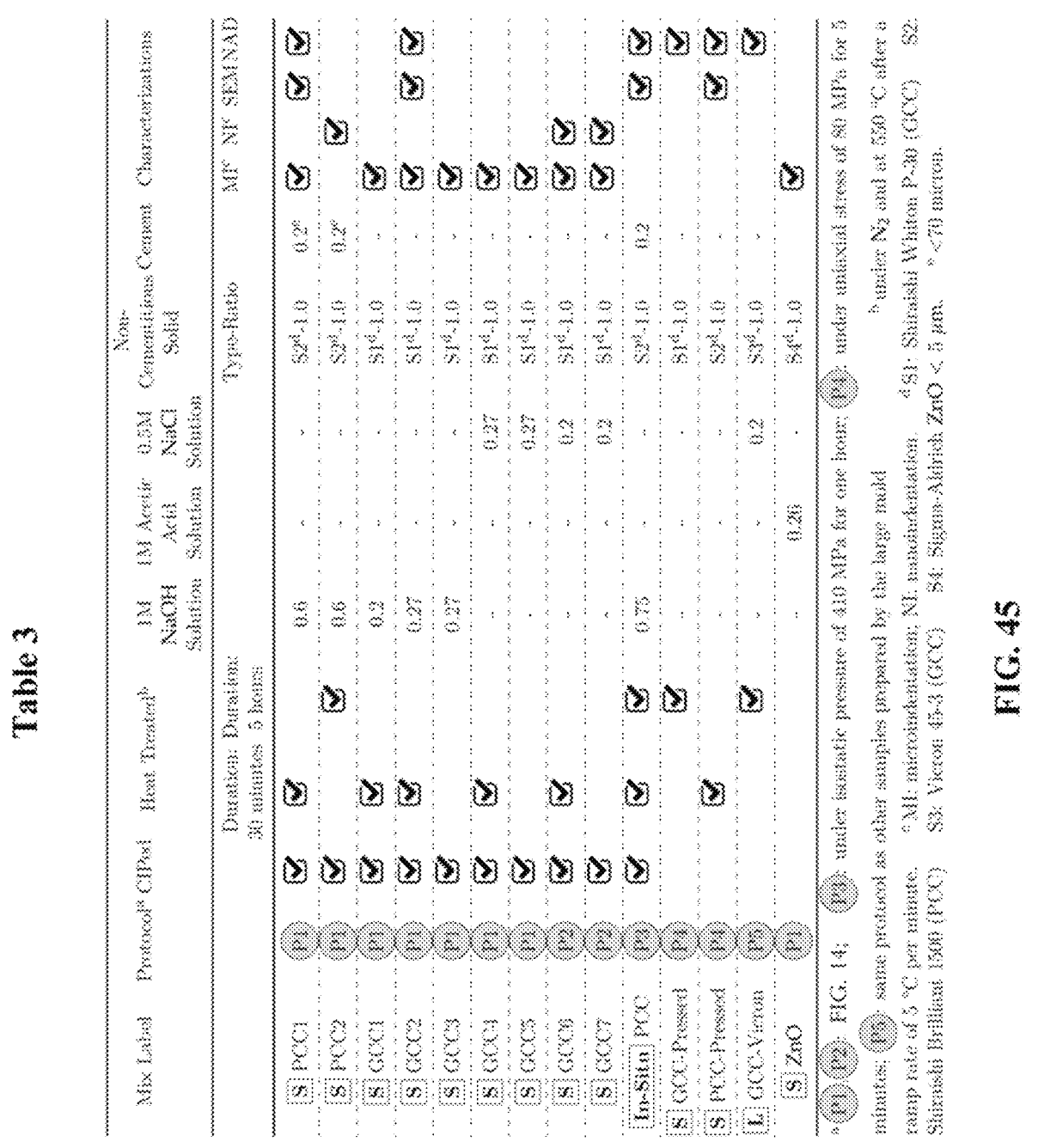

Table 3

| Mix Label | Protocol[a] | CIPed | Heat Treated[b] | | 1M NaOH Solution | 1M Acetic Acid Solution | 0.5M NaCl Solution | Non-Cementitious Solid | Cement | Characterizations | | | |
|---|---|---|---|---|---|---|---|---|---|---|---|---|---|
| | | | Duration: 30 minutes | Duration: 5 hours | | | | Type-Ratio | | MI[c] | NI[c] | SEM | NAD |
| S PCC1 | P1 | ✓ | ✓ | | 0.6 | - | - | S2[d]-1.0 | 0.2[e] | ✓ | | ✓ | ✓ |
| S PCC2 | P1 | ✓ | | ✓ | 0.6 | - | - | S2[d]-1.0 | 0.2[e] | | ✓ | | |
| S GCC1 | P1 | ✓ | ✓ | | 0.2 | - | - | S1[d]-1.0 | - | ✓ | | | |
| S GCC2 | P1 | ✓ | ✓ | | 0.27 | - | - | S1[d]-1.0 | - | ✓ | | ✓ | ✓ |
| S GCC3 | P1 | ✓ | | | 0.27 | - | - | S1[d]-1.0 | - | ✓ | | | |
| S GCC4 | P1 | ✓ | ✓ | | - | - | 0.27 | S1[d]-1.0 | - | ✓ | | | |
| S GCC5 | P1 | ✓ | | | - | - | 0.27 | S1[d]-1.0 | - | ✓ | | | |
| S GCC6 | P2 | ✓ | ✓ | | - | - | 0.2 | S1[d]-1.0 | - | ✓ | ✓ | | |
| S GCC7 | P2 | ✓ | | | - | - | 0.2 | S1[d]-1.0 | - | ✓ | ✓ | | |
| In-Situ PCC | P3 | ✓ | ✓ | ✓ | 0.75 | - | - | S2[d]-1.0 | 0.2 | | | ✓ | ✓ |
| S GCC-Pressed | P4 | | | ✓ | - | - | - | S1[d]-1.0 | - | | | | ✓ |
| S PCC-Pressed | P4 | | ✓ | | - | - | - | S2[d]-1.0 | - | | | ✓ | ✓ |
| L GCC-Vicron | P5 | | | ✓ | - | - | 0.2 | S3[d]-1.0 | - | | | | ✓ |
| S ZnO | P1 | | | | - | 0.26 | - | S4[d]-1.0 | | ✓ | | | |

[a] P1 P2: FIG. 14; P3: under isostatic pressure of 410 MPa for one hour; P4: under uniaxial stress of 80 MPa for 5 minutes; P5: same protocol as other samples prepared by the large mold [b] under $N_2$ and at 550 °C after a ramp rate of 5 °C per minute. [c] MI: microindentation; NI: nanoindentation. [d] S1: Shiraishi Whiton P-30 (GCC) S2: Shiraishi Brilliant 1500 (PCC) S3: Vicron 45-3 (GCC) S4: Sigma-Aldrich ZnO < 5 $\mu m$. [e] <70 micron.

FIG. 45

Table 4

| | GCC Powder | L Densified GCC-NaCl | S Densified GCC-NaCl | S Densified GCC-NaOH | PCC Powder | S Densified PCC-NaOH | ZnO Powder | S Densified ZnO |
|---|---|---|---|---|---|---|---|---|
| BET Surface Area ($\frac{m^2}{g}$) | 2.49 | 6.16 | 1.13 | 1.25 | 12.56 | 5.01 | 6.46 | 2.02 |
| t-Plot External Surface Area ($\frac{m^2}{g}$) | 2.12 | 7.92 | 1.54 | 1.39 | 12.58 | 6.07 | 5.58 | 1.95 |
| BJH Adsorption cumulative surface area ($\frac{m^2}{g}$) of pores[a] | 2.20 | 6.08 | 1.01 | 0.98 | 10.66 | 4.08 | 5.77 | 1.31 |
| BJH Desorption cumulative surface area ($\frac{m^2}{g}$) of pores[a] | 2.41 | 6.73 | 1.49 | 1.14 | 12.50 | 5.04 | 5.88 | 1.98 |

[a] pore widths between 17 Å and 3000 Å.

FIG. 46

Table 5

| | 14-Day Cement Paste | 42-Day Cement Paste | L 42-Day Densified GCC(83.3%)\|Cement(16.7%) | S 12-Hour Densified PCC(57%)\|Cement(43%) | S Densified SF | S Densified SF-NaOH |
|---|---|---|---|---|---|---|
| BET Surface Area ($\frac{m^2}{g}$) | 23.57 | 21.27 | 26.16 | 16.86 | 22.31 | 18.54 |
| t-Plot External Surface Area ($\frac{m^2}{g}$) | 25.74 | 23.74 | 28.96 | 18.52 | 20.18 | 15.98 |
| BJH Adsorption cumulative surface area ($\frac{m^2}{g}$) of pores[a] | 26.24 | 21.48 | 28.05 | 17.76 | 18.50 | 14.01 |
| BJH Desorption cumulative surface area ($\frac{m^2}{g}$) of pores[a] | 43.45 | 30.57 | 35.94 | 25.32 | 22.55 | 17.61 |

[a] pore widths between 17 Å and 3000 Å.

FIG. 47

Table 6

| | S GCC2 | In-Situ PCC - 30-Minute Heat | In-Situ PCC - 5-Hour Heat | S GCC-Pressed | S PCC-Pressed | Vicron GCC Powder | L GCC-Vicron |
|---|---|---|---|---|---|---|---|
| BET Surface Area ($\frac{m^2}{g}$) | 1.18 | 9.01 | 7.76 | 1.51 | 7.60 | 0.84 | 0.55 |
| t-Plot External Surface Area ($\frac{m^2}{g}$) | 1.63 | 8.76 | 5.90 | 1.48 | 9.00 | 0.71 | 0.61 |
| BJH Adsorption cumulative surface area ($\frac{m^2}{g}$) of pores[a] | 0.93 | 8.00 | 6.28 | 1.37 | 6.34 | 0.72 | 0.70 |
| BJH Desorption cumulative surface area ($\frac{m^2}{g}$) of pores[a] | 1.13 | 8.24 | 7.08 | 1.79 | 8.79 | 0.86 | 0.82 |

[a] pore widths between 17 Å and 3000 Å.

FIG. 48

PROCESS FOR COLD SINTERING OF CALCIUM CARBONATE FOR PRECAST CONSTRUCTION MATERIALS

CROSS-REFERENCE TO RELATED APPLICATIONS

This application is the U.S. national stage application of International Patent Application No. PCT/US2021/041856, which is related to and claims the benefit of U.S. provisional application No. 62/706,352, filed on Aug. 11, 2020, the entire contents of each is incorporated herein by reference.

FIELD OF THE INVENTION

Embodiments relate to use of a solution having low molarity to form a mixture with a ceramic compound that will facilitate formation of a sintered ceramic compact exhibiting grain boundary formation, low porosity, adequate compressive strength, and adequate hardness to be used as precast masonry block unit or drywall sheets for construction applications.

BACKGROUND OF THE INVENTION

Ordinary portland cement (OPC) production accounts for 5-8% of global $CO_2$ emission, predominantly by the heat treatments involved (approx. 1600° C.) and decomposition of limestone and clay. Conventional efforts to reduce the $CO_2$ emissions when producing cement include partial replacement of the cement with supplementary cementing materials (SCMs), limestone calcined clay cement ($LC^3$), alternative cement clinkers such as calcium silicate clinkers sequestrating $CO_2$, and alkali-activated and geopolymer binders. The system can potentially be used in extraterrestrial habitat construction, where transportation of a construction materials manufacturing system is more economic than transportation of constructions materials such as cement.

BRIEF SUMMARY OF THE INVENTION

Embodiments relate to use of a solution having low molarity to form a mixture with a ceramic compound that will facilitate formation of a sintered ceramic compact exhibiting grain boundary formation, low porosity, adequate compressive strength, and adequate hardness to be used as a precast masonry block in buildings as well as other construction materials applications such as drywall sheets, countertop materials similar to marble or architectural stone.

In an exemplary embodiment, a method of forming a sintered ceramic can involve combining a raw material compound with an aqueous solution, the aqueous solution having a molarity up to 1.0M to form a mixture. The method can involve applying pressure and/or temperature to the mixture to cause the compound to sinter and generate a sintered material, wherein sintering involves supersaturation of compressed contact zones between grains of the compound.

In some embodiments, the raw material compound is in powder form.

In some embodiments, the raw material compound has a uniform particle size distribution.

In some embodiments the raw material compound has a non-uniform particle size distribution.

In some embodiments, the pressure is applied within a range from 10 to 300 MPa.

In some embodiments, the temperature is applied within a range from 100 to 250° C.

In some embodiments, the raw material compound is calcium carbonate.

In some embodiments, the raw material compound is any one or combination of ground calcium carbonate and precipitated calcium carbonate.

In some embodiments, the raw material compound is any one or combination of calcium carbonate, silica, zincite, clay. The material compound can also be any combination of several minerals and/or clays.

In some embodiments, the aqueous solution has a molarity of 1.0M.

In some embodiments, the aqueous solution comprises any one or combination of aqueous sodium hydroxide (NaOH) solution or aqueous sodium chloride (NaCl).

In some embodiments, the method further involves forming a precast block or a building unit from the sintered material.

In some embodiments, the precast block includes the raw material compound, a binder, and fiber.

In some embodiments the binder is a cement pore solution.

In some embodiments, the method further involves adding aggregate to the block.

In some embodiments the method further involves adding a supplemental additive to the mixture to any one or combination of: provide alkali ions during sintering; and draw water of the solution into hydration reactions to direct water vapor away from grains of the compound.

In some embodiments, the alkali ions comprise any one or combination of sodium ions ($Na^+$) and potassium ions ($K^+$).

In some embodiments, the supplemental additive is any one or combination of cement pore solution, calcium hydroxide, and supplementary cementing materials comprises ground granulated blast-furnace slag.

In some embodiments, the method further involves heat treating the sintered material close to and less than decomposition temperature of the raw compound.

In some embodiments, the raw compound is a ceramic material with calcium carbonate as the primary compound, and the decomposition temperature of the raw compound is close to 550° C.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages, and possible applications of the present invention will be more apparent from the following more particular description thereof, presented in conjunction with the following drawings. It should be understood that like reference numbers used in the drawings may identify like components.

FIG. 1 shows an exemplary method for carrying an embodiment of the sintering process.

FIG. 5 shows a typical preparation method of the cold sintering samples (with or without aggregate/cement/fiber/superplasticizer) for the large mold.

FIG. 15 shows the preparation of cold sintered samples before placement in the CIP set-up.

FIG. 43 shows Table 1, which shows mix proportion of samples in the compressive strength study (using the large mold) in terms of mass ratio with respect to non-cementitious solid in sintered/densified samples and to cement in non-densified samples.

FIG. 44 shows Table 2, which shows mix proportion of samples in the NAD porosimetry study in terms of mass ratio with respect to non-cementitious solid in sintered/densified samples and to cement in non-sintered samples. L and S refer to densified samples prepared by the large and small molds, respectively.

FIG. 45 shows Table 3, which shows mix proportion of cold sintered, pressed or mixed in-situ and subjected to CIP and/or heat treatment. Ratios are in terms of mass with respect to non-cementitious solid. L and S refer to densified samples prepared by the large and small molds, respectively.

FIG. 46 shows Table 4, which shows surface area of sintered/densified samples measured by nitrogen adsorption-desorption.

FIG. 47 shows Table 5, which shows surface area of sintered/densified and cement paste samples measured by nitrogen adsorption-desorption.

FIG. 48 shows Table 6, which shows surface area of sintered/densified samples subjected to CIP and/or heat treatment (Table 3) and measured by nitrogen adsorption-desorption.

DETAILED DESCRIPTION OF THE INVENTION

Figure 2:
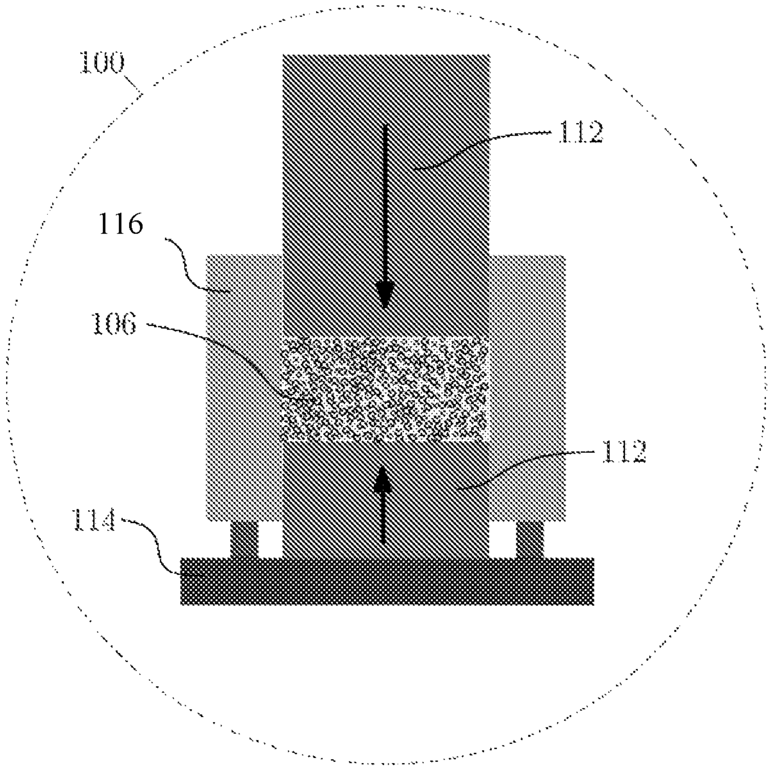
FIG. 2 shows an exemplary system for sintering a ceramic compound in accordance with an embodiment of the sintering process.

The following description is of an embodiment presently contemplated for carrying out the present invention. This description is not to be taken in a limiting sense but is made merely for the purpose of describing the general principles and features of the present invention. The scope of the present invention should be determined with reference to the claims.

Embodiments can involve an apparatus 100 configured to carry out a sintering process. The sintering process can be a cold sintering process. Embodiments of the cold sintering process can involve combining a ceramic compound 102, in particle form, with a solution 104. The solution 104 can be selected to partially solubilize the ceramic compound 102 to form a mixture 106. It is contemplated for the solution 104 to be an aqueous solution. Moderate pressure can be applied (e.g., 10-300 MPa) at low temperatures (e.g., 100-250° C.) to the mixture 106. The application of pressure and temperature can evaporate the solution 104 via a transient aqueous environment, leading to densification of the ceramic compound 102. For instance, the application of pressure can provide the force needed to sinter the ceramic compound 102. The application of temperature can cause the solution 104 to evaporate, supersaturate any solubilized species, and densify the ceramic compound 102. The densification of the ceramic compound 102 forms a sintered ceramic material. The resultant sintered ceramic material can be used as a precast block 108 in construction material applications. For instance, sintering process can be used to generate a compact that is a precast block 108 made of calcium carbonate. The sintering process creates a construction component like a block, brick, or tile to be used in construction. As will be explained herein, the resultant sintered ceramic material can exhibit grain boundary formation, low porosity, adequate compressive strength, and adequate hardness to be used as a precast block 108. In addition, use of the cold sintering process can reduce the amount of $CO_2$ emissions associated with producing cementitious construction components.

It is contemplated for the ceramic compound 102 to be calcium carbonate ($CaCO_3$). The $CaCO_3$ can be ground calcium carbonate, precipitated calcium carbonate, etc. Using a cold sintering process can reduce the amount of carbon dioxide generated when producing portland cement, and thus cold sintering of calcium carbonate (e.g., limestone, calcite, aragonite, vaterite, amorphous calcium carbonate (ACC), ground calcium carbonate (GCC), precipitate calcium carbonate (PCC), etc.) is desired. However, other ceramic compounds can be made from materials such as fumed silica and metakaolin, typically used in construction materials (e.g., brick, mortar, concrete, etc.), or clay minerals such as the smectite, illite, kaolinite, and montmrillonite groups, as well as a combination of several minerals and/or clays. Gypsum may also be part of the matrix.

It was discovered that using a solution 104 having low molarity (e.g., 1.0M) facilitates producing a resultant sintered ceramic material comprising calcium carbonate via cold sintering. The solution 104 can be aqueous sodium hydroxide (NaOH) solution, aqueous sodium chloride (NaCl) solution, water ($H_2O$), etc. Results demonstrate that the resultant calcium carbonate material exhibits grain boundary formation, low porosity, adequate compressive strength, and adequate hardness to allow the sintered calcium carbonate material to be used as a precast block for construction materials. Use of the solution 104 during the sintering process allows for supersaturation of the compressed contact zones between the grains of the ceramic compound 102 by solution vapor upon heating the mixture 106 and growth of grain boundaries under the compression.

After the mixture 106 is formed, supplemental additives 110 may be added. For instance, a cement pore solution may be added to the mixture 106 to: 1) provide alkali ions (e.g., $Na^+$ and $K^+$) to assist sintering, and/or to 2) draw water of the solution 104 into hydration reactions that may direct the water vapor away from the grains of the ceramic compound and help promote grain boundary formation. For instance, alumina content of calcined clay (metakaolin), produced by heat treatment up to 800° C., can react with calcium carbonate in presence of sufficient calcium ions supplied from sources such as cement pore solution. Other supplemental additives can include calcium hydroxide, ground granulated blast-furnace slag, silica fume, etc.

In some embodiments, the resultant sintered ceramic material can be heat treated (up to 550° C.) to improve (reduce) porosity, and thus durability, before the sintered ceramic material is used as a precast block 108. This can involve placing the resultant sintered ceramic material in a furnace for a predetermined amount of time to provide the desired heat treatment.

The resultant sintered material can be used as a precast block 108. For instance, the raw materials such as calcium carbonate can constitute the primary component of the precast block 108, where cement pores, as binder, and fiber may be used to enhance the mechanical properties of the block for a particular application. In such a composition, the raw material can comprise 80% by weight of the ingredients, where the cement and fiber constitute 20% by weight of the ingredients. Additional materials (e.g., aggregate) can be added to the composition to form concrete, concrete masonry units (CMUs), mortar, etc.

Figure 42:
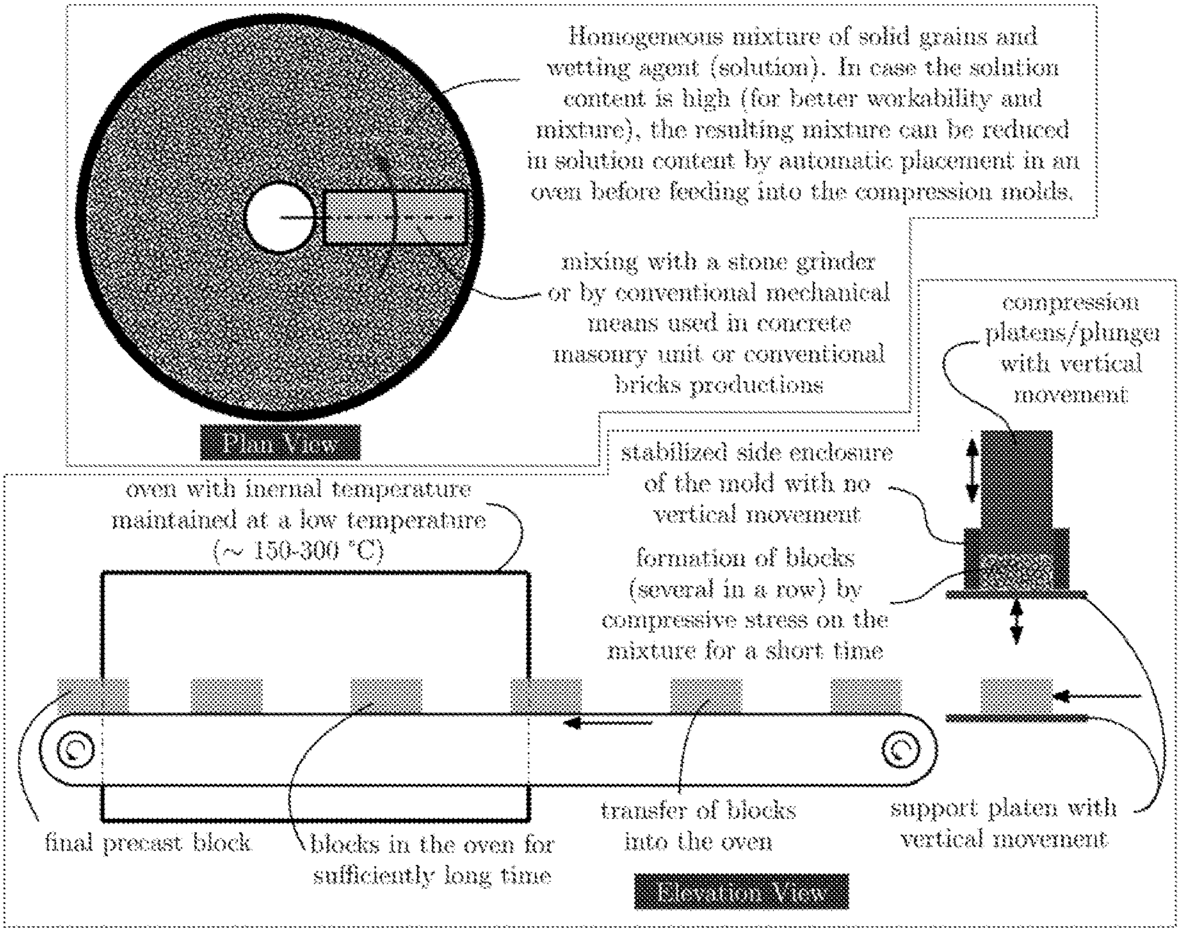
FIG. 42 shows an exemplary schematic for a large-scale production of construction materials blocks through cold sintering.

Referring to FIGS. 1-2 and 42, an exemplary method of carrying out an embodiment of the sintering process. It can involve an initial stage of converting a compound 102 (e.g., $CaCO_3$) to powder form. The particle size can be submicron or up to 50 micron. This can be achieved by milling the compound by ball milling, attrition milling, vibratory milling and jet milling, etc. The powder can have coarse grounds or round grounds. The method further involves combining the sufficiently fine compound 102 with an aqueous solution 104 (e.g., NaOH solution) to form a mixture 106. The method further involves allowing the solution 104 to partially solubilize the ceramic compound to form the mixture 106. The method can further involve adding a supplemental additive 110 (e.g., cement pore solution) to the mixture 106.

The method can further involve applying pressure to the mixture 106 via a transient aqueous environment, leading to densification of the compound 102 by a mediated dissolution-precipitation process. The method can further involve applying temperature to the mixture 106 to cause the solution 104 to evaporate, supersaturate any solubilized species, and densify the compound 102. For instance, the mixture 106 can be placed on a die 114 of a press 112. The press 112 can be a constant pressure hydraulic press, for instance. The press 112 can be secured to a load frame with the die 114. The die 114 can be configured to receive and retain a volume of the mixture 106. The press 112 can be actuated to impart pressure onto the mixture by advancing a hydraulic cylinder towards the die 114. The die 114 and the load frame can be configured to withstand the force of the hydraulic cylinder so as to transfer the force to the mixture, thereby imparting pressure onto the mixture. It is contemplated for the pressures applied to be within the range from 10 to 300 MPa. The application of pressure can aid in the sintering of the ceramic particles while the solution 104 evaporates. A heater band 116 can be coupled to the die 114 and be connected to an electrical power source for applying the heat to the die 114, which is transferred to the mixture when the mixture 106 is placed therein. It is contemplated for the temperature applied to be within the range from 100 to 250° C. The application of heat can cause the solution 104 to evaporate, supersaturate any solubilized species, and densify the compound 102 to form the sintered material and/or the sintered composite.

The method can further involve allowing the supplemental additive 110, during sintering, to provide alkali ions and/or draw water of the solution 104 into hydration reactions to direct water vapor away from the grains of the ceramic compound 102 and promote grain boundary formation. The method can further involve heat treating the sintered material and/or the sintered composite. This can involve placing the sintered material and/or the sintered composite in a furnace set at a predetermined temperature for a predetermined amount of time.

Calcium carbonate has applications in paint/coating, food/pharmaceutical, paper, textile and agricultural industries. In civil engineering applications, sintering of calcium carbonate and silica are of particular interest due to their abundance and affinity. In cold sintering of lab-synthesized nano-silica in literature, additional water used during sintering can reduce or eliminate mesopores and hence significantly improve the densification. The number of macropores however have been reported increased, reaching several hundreds of nanometer in samples of nano-silica with additional water, lowering their fracture toughness and making them very brittle. The macropores presence has been attributed to (1) disturbance in organized packing of the starting nano-silica particles caused by additional water, and (2) possibly water being trapped in the macropores prior to the sintering.

Limestone, as the primary source of ordinary portland cement, is chiefly composed of calcium carbonate crystalline forms such as calcite and aragonite. Cold sintering of synthesized nano-sized vaterite, another form of calcium carbonate, in aqueous and oil mediums has been reported to achieve desirable mechanical properties. In preparation of the sample, after the applied stress reaches the maximum constant (creep) stress and at a given relative porosity, higher maximum creep stresses leads to higher strain rate and hence higher densification.

The powder starting particle size distribution is another important factor in density improvement. The nano-scale size of the synthesized vaterite grains has been reported to significantly increase the strain rate at a specific creep stress but the relative porosity may increase when compared to sintered product of natural calcite with grain sizes larger than one micron.

Water content and thermodynamic equilibrium affects the crystalline form of calcium carbonate. Mechanical stirring has been shown to transform the calcium carbonate into more vaterite, while additional water results in conversion of vaterite to calcite. In addition, grinding can change the $CaCO_3$ crystal structure.

Experimental Studies

Studies were conducted to assess the feasibility of cold sintering calcium carbonate. Among other material properties, grain boundary formation, porosity, compressive strength, and hardness were evaluated.

Figure 3:
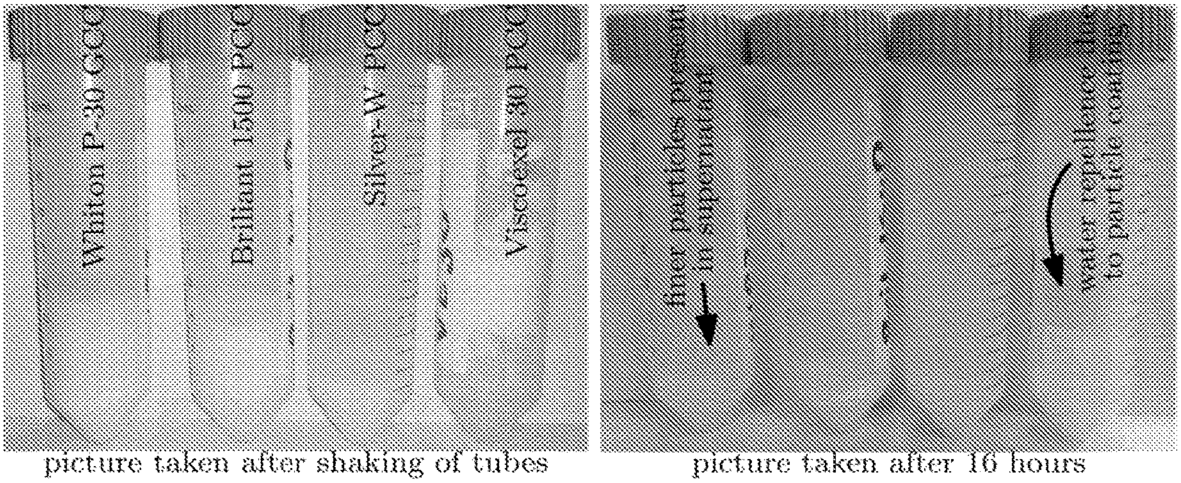
FIG. 3 illustrates suspension of four grades of calcium carbonate (1 gram in 17 gram of water) obtained from Shiraishi Calcium Kaisha Ltd, Japan.

FIG. 3 illustrates suspension of four grades of calcium carbonate (1 gram in 17 gram of water) obtained from Shiraishi Calcium Kaisha Ltd, Japan. Uncoated Whiton P-30 $CaCO_3$, a ground calcium carbonate (GCC), exhibited higher affinity with water due to coarser particle size distribution (PSD), as compared to two uncoated Briliant 1500 $CaCO_3$ (with average particle size of 150 nm) and Silver-W precipitated calcium carbonate (PCC) grades and Viscoexel 30 (average particle size of 30 nm) ultra-fine PCC coated with fatty acids. The PCC grades were synthesized by reaction of $Ca(OH)_2$ and $CO_2$ and exhibit more uniform PSDs. Other factors aside, owing to its finer and more uniform PSD, PCC was expected to outperform GCC in development of regular grain boundaries under cold sintering. Howbeit, its synthesization cost/energy may not enlist it as the first alternative. Narrower and finer PSD of GCC may be preferred.

Early and excessive escape of the liquid medium utilized in cold sintering within the mold gaps affects the density gain where notably higher pressures might be needed to gain the desired density. Use of such sealants as polyvinyl pyrrolidone (PVP) adhesive to mitigate water escape has been reported to reduce the pressure needed to obtain full density largely. The extra pressure needed for unsealed samples could partly be caused by the high friction forces developed in the gaps caused by the transport of the liquid medium carrying the solute in the early stage of cold sintering heat/pressure application and the solute residue left in the gaps upon evaporation of the liquid medium. Therefore, a sealed design to minimize the escape in the early stage of the sintering can be beneficial.

The ultrafine Viscoexcel-30 PCC was utilized first in the cold sintering tests of this study. Its repellency of water in addition to its fine particle size did not lead to sintered samples with sufficient cohesion. The fine particle size caused more escape of the sample within gaps of the mold during the sintering, causing friction and potentially, lower transfer of the applied stress on the sample. The frictional forces developed also lead to higher sensitivity of the sample to circumferential cracking, forming stacked layers of dense compacts. This was observed to a lesser extent when coarser Brilliant 1500 PCC was utilized.

Cold sintering of micron-sized limestone powder has been studied under various carbon dioxide pressures as $CO_2$ facilitates solubility of limestone in water and hence allows higher densification of the compact. Sintering of submicron calcite utilizing very low compressive stresses has been achieved using such agents as a mixture of KF, NaF, and LiF but high temperature may still be needed to obtain sintered compacts.

Rainwater with dissolved carbon dioxide (and therefore mildly acidic) is the key factor in higher solubility of calcium carbonate in this water (the following equilibrium (Eq. 1.1) toward the right side) and, upon travel of the solution, leads to the formation of cave stalactites and stalagmites (reversal of the equilibrium to the left).

$$\underset{solid}{CaCO_3} + H_2O + \underset{aqueous}{CO_2} \rightleftharpoons \underset{aqueous}{Ca(HCO_3)_2} \tag{1.1}$$

Sulfuric acid ($H_2SO_4$), generated primarily by human activity, accounts for 75% of the acidity of (polluted) rainwater in the modern era and is the main cause of erosion in historic monuments and components made of limestone and marble by formation of gypsum (Eq. 1.2):

$$\underset{solid}{CaCO_3} + \underset{aqueous}{H_2SO_4} \longrightarrow \underset{gypsum}{CaSO_4} + \underset{gas}{CO_2} + H_2O \tag{1.2}$$

Therefore, milder acidic solutions such as acetic acid, despite increasing the solubility of calcium carbonate by the following equilibrium (Eq. 1.3), is less likely to be beneficial in the cold sintering of calcium carbonate. The generated calcium acetate ($Ca(CH_3COO)_2$) is more soluble in water but its decomposition to $CaCO_3$ (one alternative to synthesize acetone) requires temperatures higher than that used in this study.

$$CaCO_3\ (solid) + 2\,CH_3COOH\ (liquid) \longrightarrow Ca(CH_3COO)_2\ (solid) + CO_2\ (gas) + H_2O \quad (1.3)$$

However, an aqueous solution of acetic acid with a molarity of 1.0M (close to its molarity in vinegar) has been shown to be highly effective in sintering of zinc oxide reaching over 90% of its theoretical density. Cold sintered zinc oxide compacts with reasonably high strengths, compared to traditionally sintered zinc oxide has also been obtained.

Salinity of the water improves solubility of calcium carbonate and can assist in the sintering when low molarities (less than 1 weight %) are utilized. Alkaline environment of 10M aqueous solution of sodium hydroxide has been reported favorable in cold (hydrothermal) sintering of calcium carbonate with the following reaction (Eq. 1.4) driving towards the right on the surface of the calcium carbonate grains at higher maximum temperature of 300° C. The reaction mostly leans to the left with cold sintering at ambient temperature without calcium hydroxide formation.

$$CaCO_3\ (solid) + 2\,NaOH\ (aqueous) \rightleftharpoons Ca(OH)_2\ (aqueous) + Na_2CO_3\ (aqueous) \quad (1.4)$$

The grain shape of the sintering product has been reported to be more smooth and round, and sintered necks formed more abundantly when a higher maximum temperature of 300° C. mostly under the creep stress of 70 MPa was utilized. Higher temperatures less than calcium carbonate decomposition temperature potentially enhance the sintering. Water-free amorphous calcium carbonate (ACC) nanoparticles have also been sintered at 250-400° C. under 20 MPa compressive stress and reported to exhibit higher strength compared to those with lower sintering temperature. Surface area reduction was reported in the sample sintered at 400° C. This was attributed to pore collapse. Solid-solid state transformation was believed to convert ACC to aragonite and vaterite phases and, rapidly, to calcite at 400° C.

Formation of calcium hydroxide (portlandite) upon cement hydration binds nano-sized calcium (alumino) silicate hydrate (C-(A)-S—H) gels, hindering shrinkage. Cold sintering of calcium carbonate at moderately higher temperatures together with a partial replacement with OPC cement and in presence of aqueous sodium hydroxide solution may be used to produce an alternative binder system. This binder, by production of more portlandite, is expected to be more resistant to carbonation, steel corrosion, and shrinkage. In geopolymer alternatives, higher heat generation during sample preparation utilizing alkali metal hydroxides might enhance the mass transport during the process and lower or eliminate the temperature requirement in the cold sintering.

Alumina content of calcined clay (metakaolin), produced by heat treatment up to 800° C., can react with calcium carbonate in presence of sufficient calcium ions supplied from sources such as cement pore solution. Calcium hydroxide is another source for the calcium ions that can be supplied. Partial replacement of the aqueous solution with compounds such as glycerol can significantly increases solubility of calcium hydroxide and enhances the sintering process of metakaolin. Calcium carbonate in conjunction with metakaolin can potentially replace a major percentage of ordinary cement in development of cold sintering binders.

Hydrothermal cold sintering under simultaneous pressure and comparatively low temperatures was studied. Ground calcium carbonate (GCC) and precipitate calcium carbonate (PCC) were used as the primary starting materials. Ordinary portland cement (OPC) and zinc oxide were used in some of the studies. Compressive strength tests were conducted to evaluate the suitability of sintered GCC as full or partial replacement of OPC. Gas adsorption porosimetry and scanning electron microscopy were used to study particle coalescence and densification. The most challenging part in potential, mostly automated concrete block production is grinding the sample with sufficiently high water content to homogeneously reach the solids' microstructure during sample preparation, yet maintaining sufficiently low water content to minimize sample escape from the mold.

Figure 17:
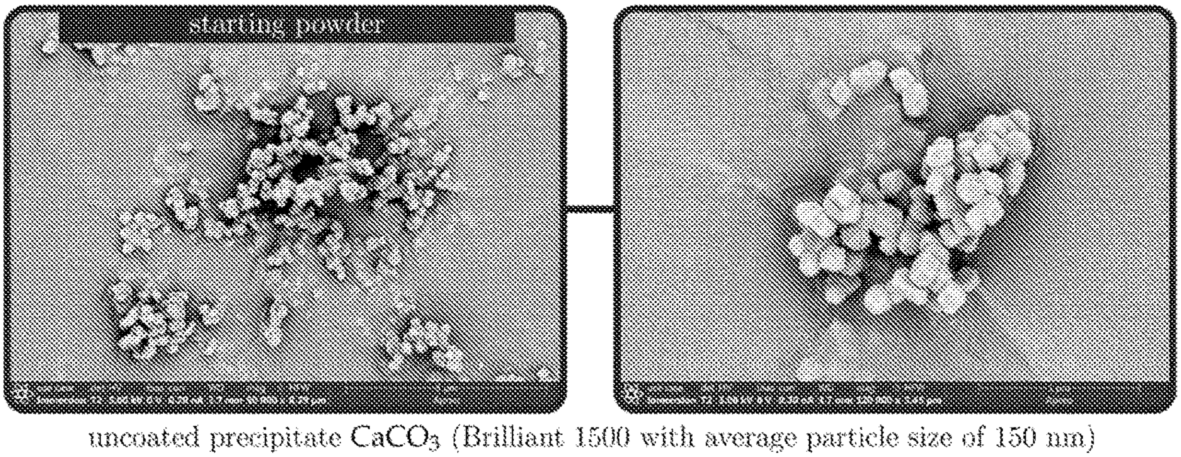
FIG. 17 shows the precipitate calcium carbonate starting (as-received non-dispersed) powder.

Whiton P-30 GCC obtained from Shiraishi Calcium Kaisha Ltd, Japan with coarser grain sizes was utilized to provide minimal sample escape when sufficiently small liquid content was used. In few of the studies, Vicron 45-3 GCC obtained from Specialty Minerals Inc was used. GCC refers to Whiton P-30 throughout this study where the type is not mentioned. Samples with Vicron 45-3 as the GCC are specified with "Vicron" in their names. Uncoated Briliant 1500 PCC obtained from Shiraishi (average particle size of 150 nm; FIG. 17), ZnO (ReagentPlus®99.9% with particle size<5 μm obtained from Sigma-Aldrich), and silica fume (MasterLife SF 100® obtained from BASF) were used in some of the studies.

Angular dolomitic normal-weight sand (297 μm≤particle size≤595 μm) was used as sand. Type I ordinary portland cement (OPC), polycarboxylate-based Sika Viscocrete™ 6100 superplasticizer, BASF MasterFiber™ M100 fiber, ASC grade NaCl, and 1.0M acetic acid aqueous solution were used in the samples. The superplasticizer (surfactant) was included in some samples to evaluate its contribution to obtain more homogeneous access of the solution to the powder. In all samples, deionized (DI) water was used.

Figure 4:
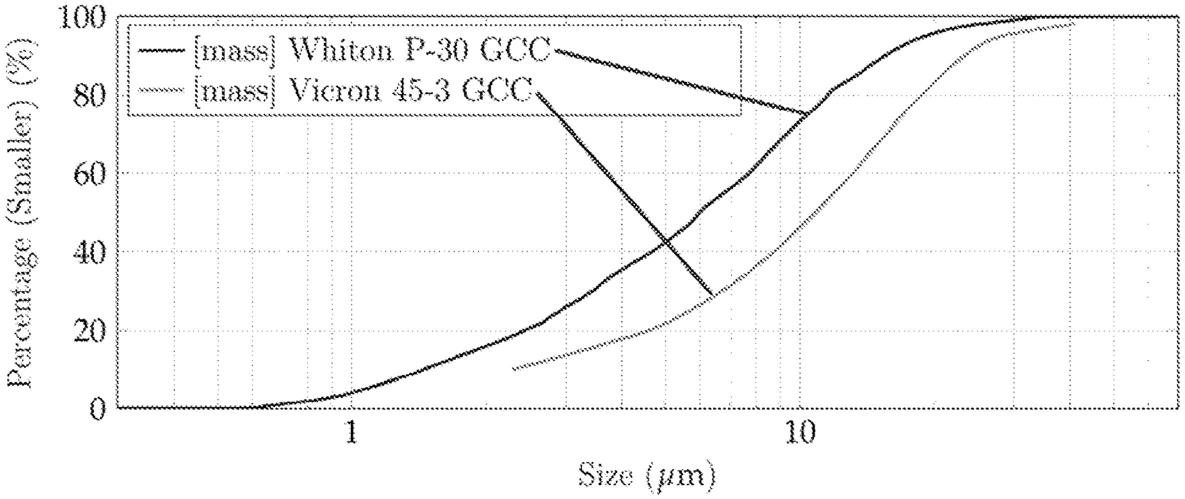
FIG. 4 shows the particle size distribution of GCC particles utilized in the cold sintering samples.
Figure 6:
FIG. 6 shows a typical preparation method of the cold sintering samples by agate mortar and pestle for the small mold.

FIG. 4 shows the particle size distribution of GCC particles utilized in the cold sintering samples. Two molds with sample diameters of 10 mm and 50 mm were used, referred to as small (S) and large (L) mold herein, respectively. A typical sample preparation procedure before placement into the large mold is shown in FIG. 5. FIG. 6 shows a typical preparation method of the cold sintering samples by agate mortar and pestle for the small mold.

For samples with only $CaCO_3$ or ZnO and aqueous solutions (without sand or fiber), low solution/powder ratio of 0.2 was used and the ground samples did not have the doughy consistency that is shown in FIG. 5. The ground mixtures were compacted with a Delrin rods in few layers after placement in the mold. The fibers and superplasticizer provided the mixture with the doughy consistency. No compaction was performed on the doughy samples. A plastic bowl was used in preparation of the samples for the large mold (50 gram≤sample mass≤350). Agate mortar and pestle were used for the preparation of the samples for the small mold (a 1 gram≤sample mass≤3 grams) with the solution/powder ratio varying.

Figure 7:
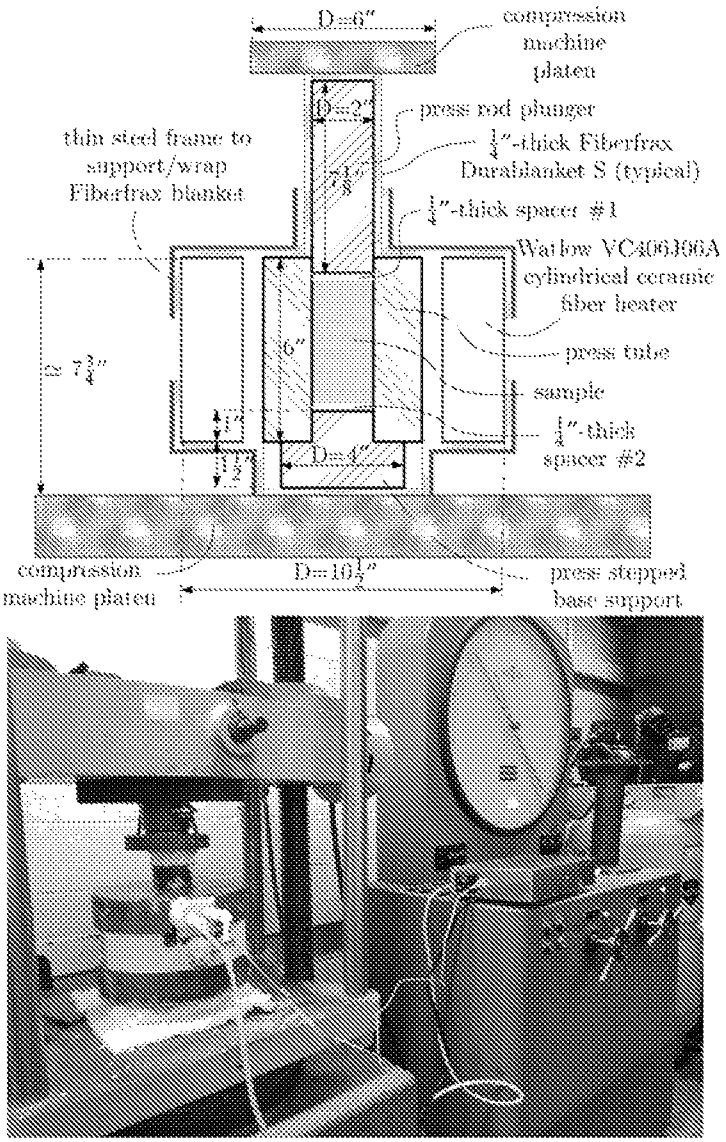
FIG. 7 shows a schematic for an exemplary test set up to assess samples.
Figure 8:
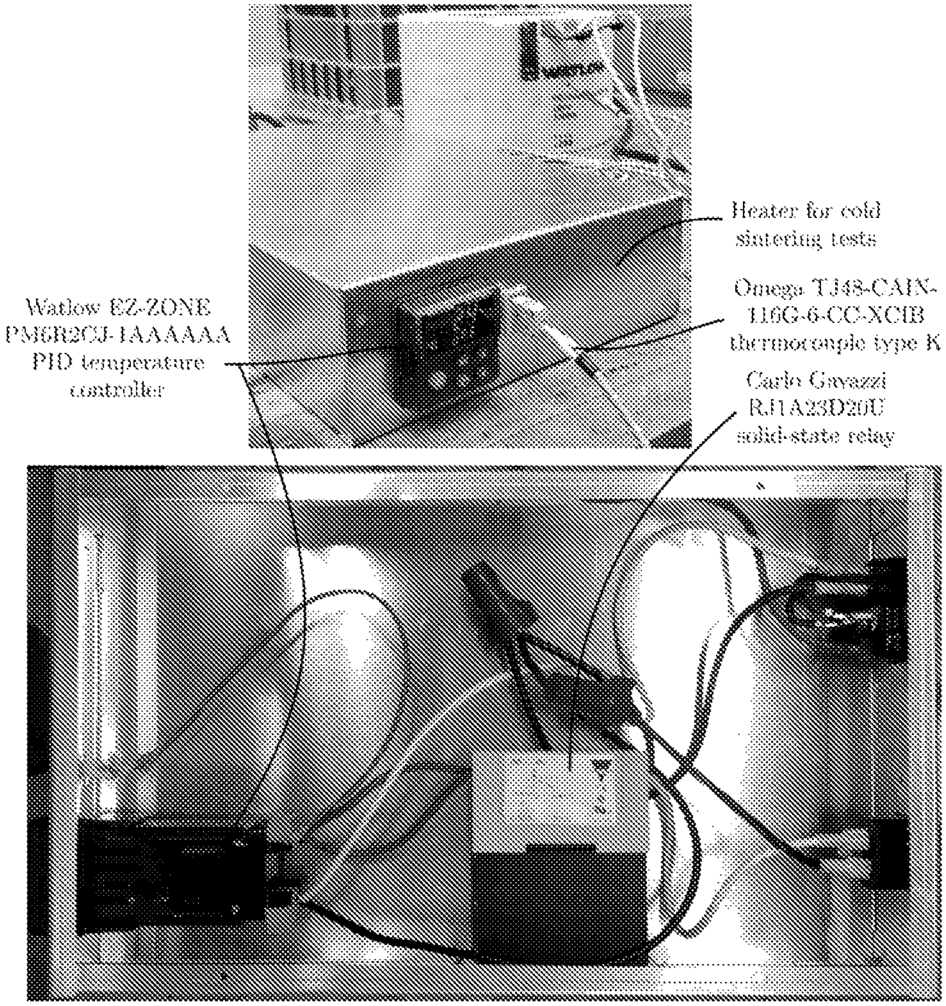
FIG. 8 shows the heater used in the exemplary test set up of FIG. 7.
Figure 9:
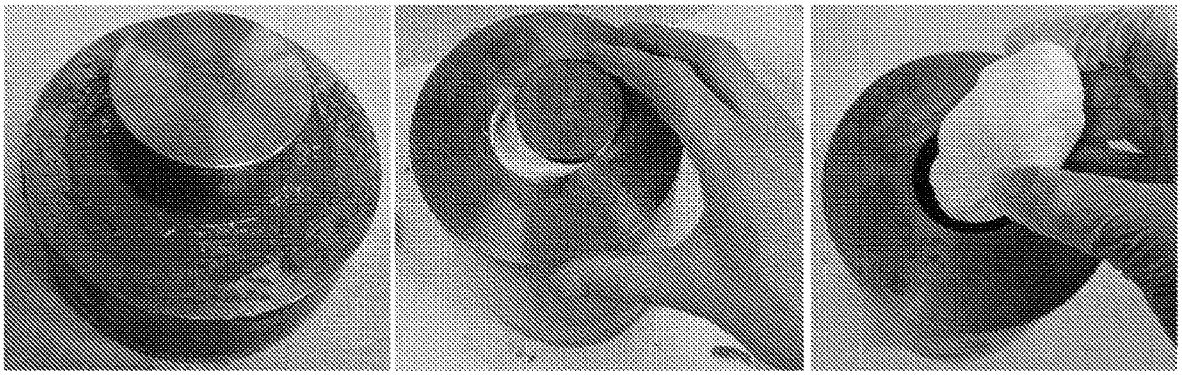
FIG. 9 shows the mold used in the exemplary test set up of FIG. 7.

One large mold and one small mold were used in preparation of samples:

Large Mold:

The sample was placed in a press mold at room temperature. The mold was machined from a pre-hardened steel (SSAB Toolox 44 with yield strength of 170 ksi at 200° C.). It was placed inside of a cylindrical ceramic fiber heater (Watlow part number: VC406J06A1; 1500 W at 120V) and subjected to heat and compression. The heater had enough watt density to reach the maximum temperature (150° C.) within 10 minutes. A schematic of this test is shown in FIG. 7. The heater and the mold are shown in FIGS. 8 and 9, respectively.

A thin layer of release agent oil was placed in the full height of the inner diameter of the tube. The sample was placed in the mold and heated to the maximum temperature (150° C.). The uniaxial load was slowly increased to the maximum load (450 kN) within 5 minutes (using a 120-kilopound compression machine) after the outside temperature of the mold reached 120° C. This maximum load was maintained for 90 minutes after which the mold was slowly unloaded. The maintained maximum load applied an axial stress of 230 MPa on the partially confined sample with diameter of 50.8 cm. The assembly was set to cool to room temperature and the sample was removed from the press mold using a plunger and additional support pieces underneath of the mold. Mostly calcium carbonate samples with or without cement were utilized as the binder in this study from which undamaged compacts were obtained. In the sample removal stage and for some samples, a force as high as 30% of the maximum load of 450 kN was needed to overcome the friction caused by the sample escape within the gap between the press rod plunger/stepped base support and the interior face of the press tube. This escape was inevitable despite acceptable mold precision machining (down to 0.001 inch in gap).

Figure 10:
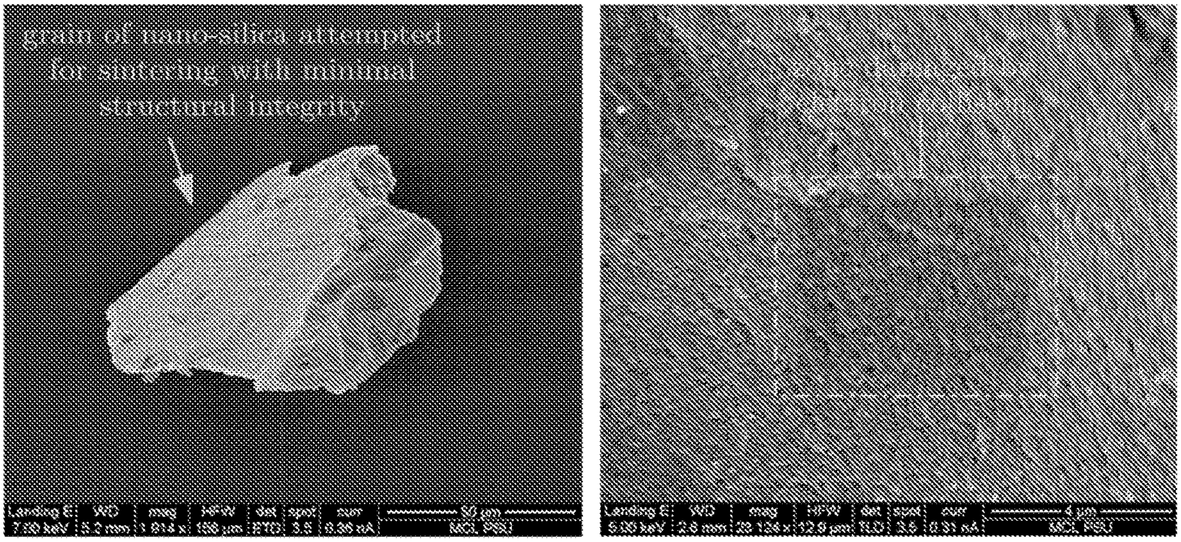
FIG. 10 shows the damage occurred to the Aerosil 380 nano-silica sample obtained from cold sintering test by electrons under scanning electron microscopy study.

One test with Aerosil 380 nano-silica did not lead to a compact with enough structural integrity (see FIG. 10). Corrosion of the interior face of the press tube is observed after the test, and thus nano-silica was not pursued in the sintering tests. The corrosion was mostly a result of the ultra-fine (≤50 nm) particles escape within the gaps.

Figure 11:
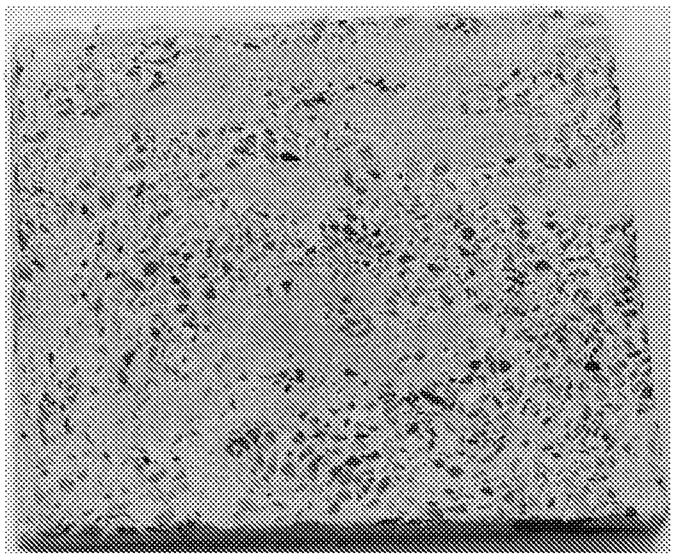
FIG. 11 illustrates a densified sample with fine aggregate (sand) mostly dispersed in the matrix of calcium carbonate, cement paste and organic fiber.

FIG. 11 illustrates a densified sample with fine aggregate (sand) mostly dispersed in the matrix of calcium carbonate, cement paste and organic fiber. More homogeneous mixture is obtainable with other means of mechanical mixing.

Figure 12:
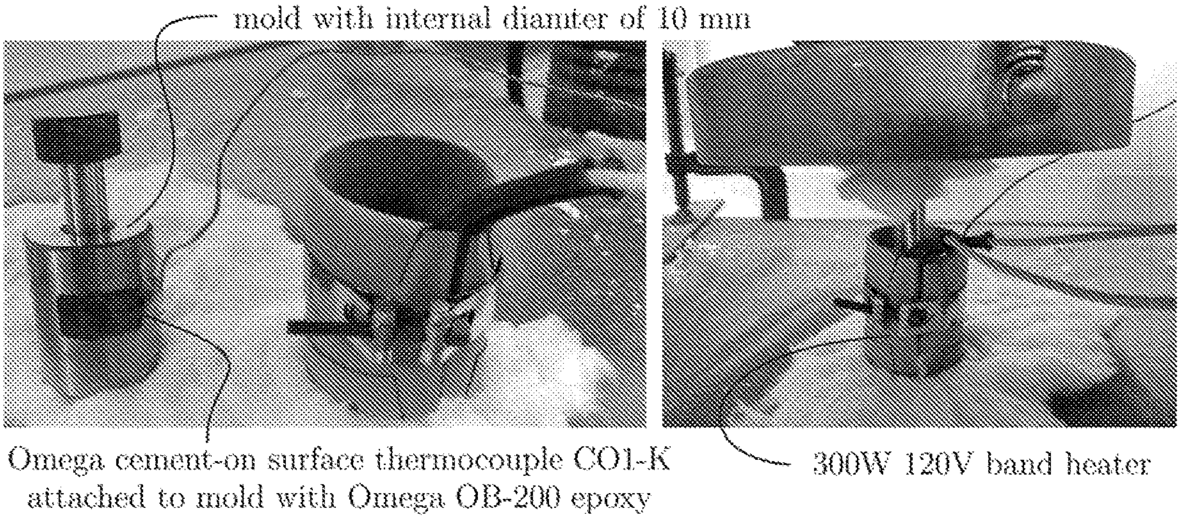
FIG. 12 shows a small mold used during the test for application of higher stresses and more sample preparation control.

Small Mold:

This mold was obtained from Across International, which allows for a higher control over sample preparation by the mortar and pestle grinder, and hence more homogeneous access of the solution to powder. Various thermomechanical regimes were conducted, which are discussed later. FIG. 12 shows the small mold. The mold was made of W18Cr4V hardened steel with recommended maximum compressive stress of 180 ksi.

Figure 13:
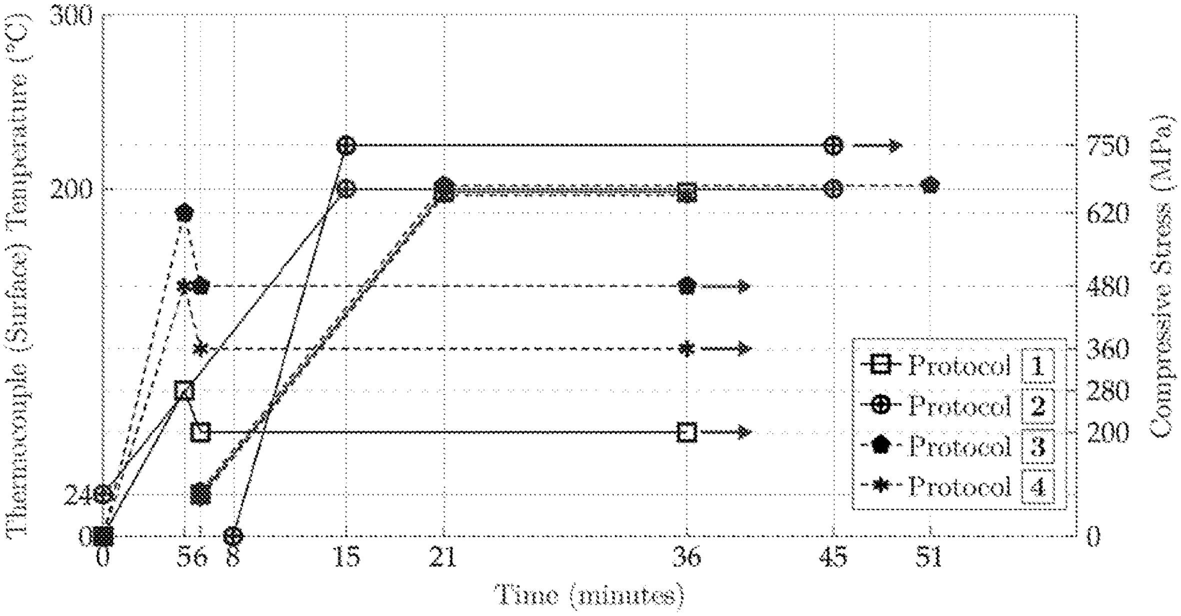
FIG. 13 shows the approximate compressive stress and average temperature profiles of samples for SEM and other studies.

FIG. 13 shows the approximate compressive stress and average temperature profiles in sample preparation for SEM and other studies.

Figure 14:
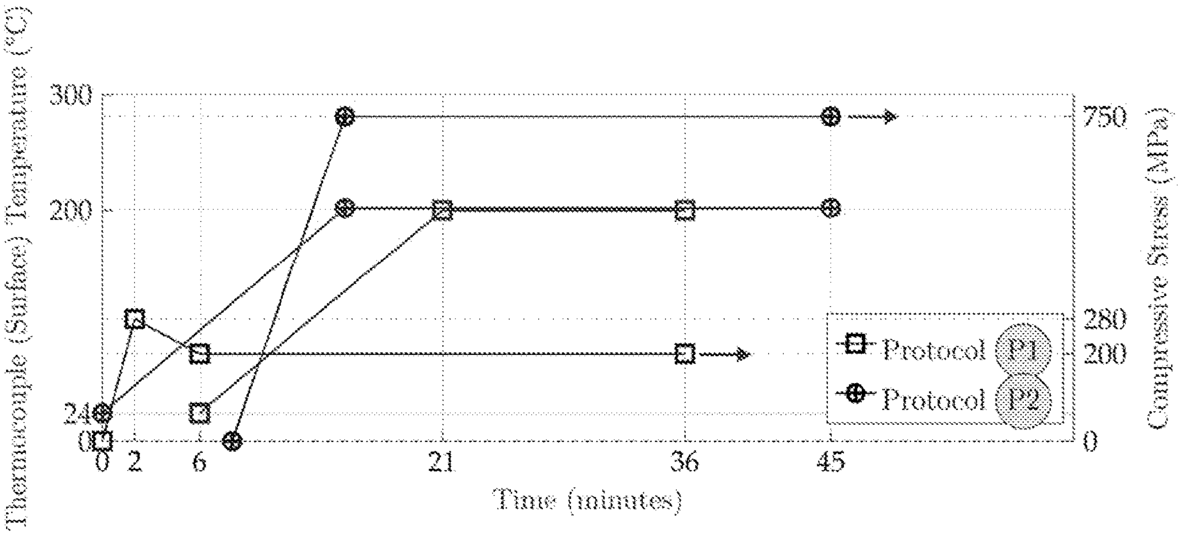
FIG. 14 shows the approximate compressive stress and average temperature profiles of cold sintered samples before cold isostatic press (CIP) and/or heat treatment.

FIG. 14 shows the approximate compressive stress and average temperature profiles in preparation of samples before cold isostatic press (CIP) and/or heat treatment. Cold sintered (under Protocol P1 or P2) samples, samples pressed without solution, and samples mixed in-situ were subjected to cold isostatic press (CIP) and/or heat treatment (Table 3).

Figure 16:
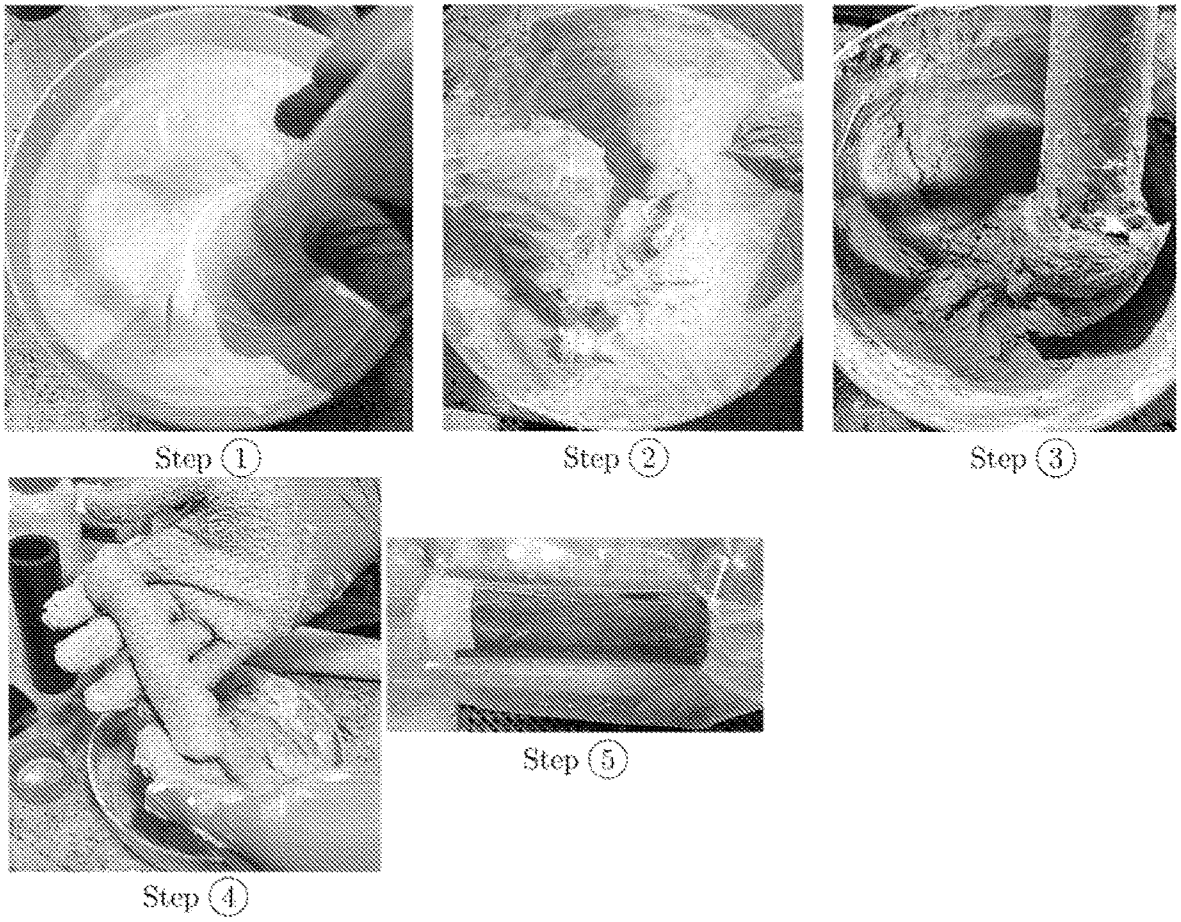
FIG. 16 shows samples mixed in-situ before placement in the CIP machine.

The following steps were followed to expose the samples to isostatic stress using Quintus Technologies research-scale CIP setup (model CP42260). Samples were placed inside vacuum bags and subjected to isostatic stress provided by a combination of water and lubricant (see FIG. 15). FIG. 16 shows the preparation of samples mixed in-situ before placement in the CIP setup. Steps 1 and 2: 75 gram of the aqueous solution was placed in the plastic bowl and 100 gram of calcium carbonate was gradually added to the solution while mixing with the mortar (in rotational movement). Step 3: 20 gram of cement was slowly added to the mixture while mixing (steps 1 to 3 took approximately 15 minutes). Steps 4 and 5: The mixture was formed and placed in the CIP plastic mold. A vacuumed bag was used to seal the sample and mold. Step 6: The assembly was placed in the CIP container and in the CIP machine.

Pore volume distribution of samples were studied using nitrogen adsorption-desorption (NAD). Brunauer-Emmett-Teller (BET) surface areas were calculated. Samples that contained cement were immersed after the test in a water bath at room temperature saturated with $Ca(OH)_2$. The sample age expressed in the mix labels refers to the time hydration was stopped after the immersion. XRD and SEM were used to evaluate the effect of grinding on phase changes of the calcite crystals and sintering grain growth, respectively.

Microindentation using Vickers tip and nanoindentation using Berkovich tip were conducted on samples prepared by the small mold. Hardness values obtained from microindentation were compared among coarse calcium carbonate grains in sintered GCC samples and the unhydrated cement grain and intermixed cement hydrates and PCC in the sintered PCC sample. Ultrafine Berkovich tip in nanoindentation was used to compare elastic modulus of the unhydrated cement grain and intermixed cement hydrates and PCC in sintered the PCC sample.

As a result of its finer and more uniform particle size distribution, PCC exhibits higher potential in terms of regular grain boundary growth under sintering when compared to GCC. Nonetheless, PCC (Brilliant 1500) sintered samples show lower fracture toughness and structural soundness compared to GCC samples. This is attributed to the inability to achieve full sintering across the sample. An additional contribution to the PCC samples' brittleness might have resulted from small water entrapments originally occupied by the solution, leaving a large number of pores behind upon evaporation, thus lowering the fracture toughness. PCC can, however, be explored in conjunction with cementitious materials. Higher structural soundness of GCC samples is believed to be caused by their higher compaction due to wider particle size distribution.

Figure 18:
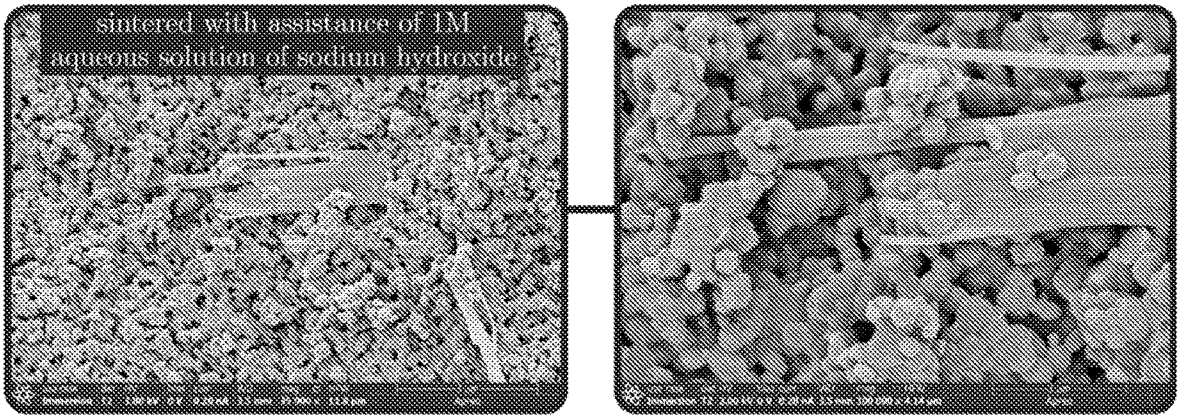
FIG. 18 shows sintered PCC with assistance of NaOH solution.

Some solutions are explored in this study for the sintering of Shiraishi Brilliant 1500 PCC (see FIG. 17). FIG. 17 shows the precipitate calcium carbonate starting powder (as-received non-dispersed powder). The small mold was used for these samples, allowing higher control in sample preparation. As shown in FIG. 18, NaOH solution excelled in sintering of the PCC. There is increased potential for consumption of $CaCO_3$ grain surfaces per Eq. 1.4 at 300° C. but this reaction is believed to be minimal due to the small solution/solid ratio and utilized lower temperature of 200° C. Reduction of the observed pores can be achieved with other thermomechanical regimes and more certainly, by isostatic stresses, utilizing cold isostatic press (CIP) or hot isostatic press (HIP) setups.

Figure 19:
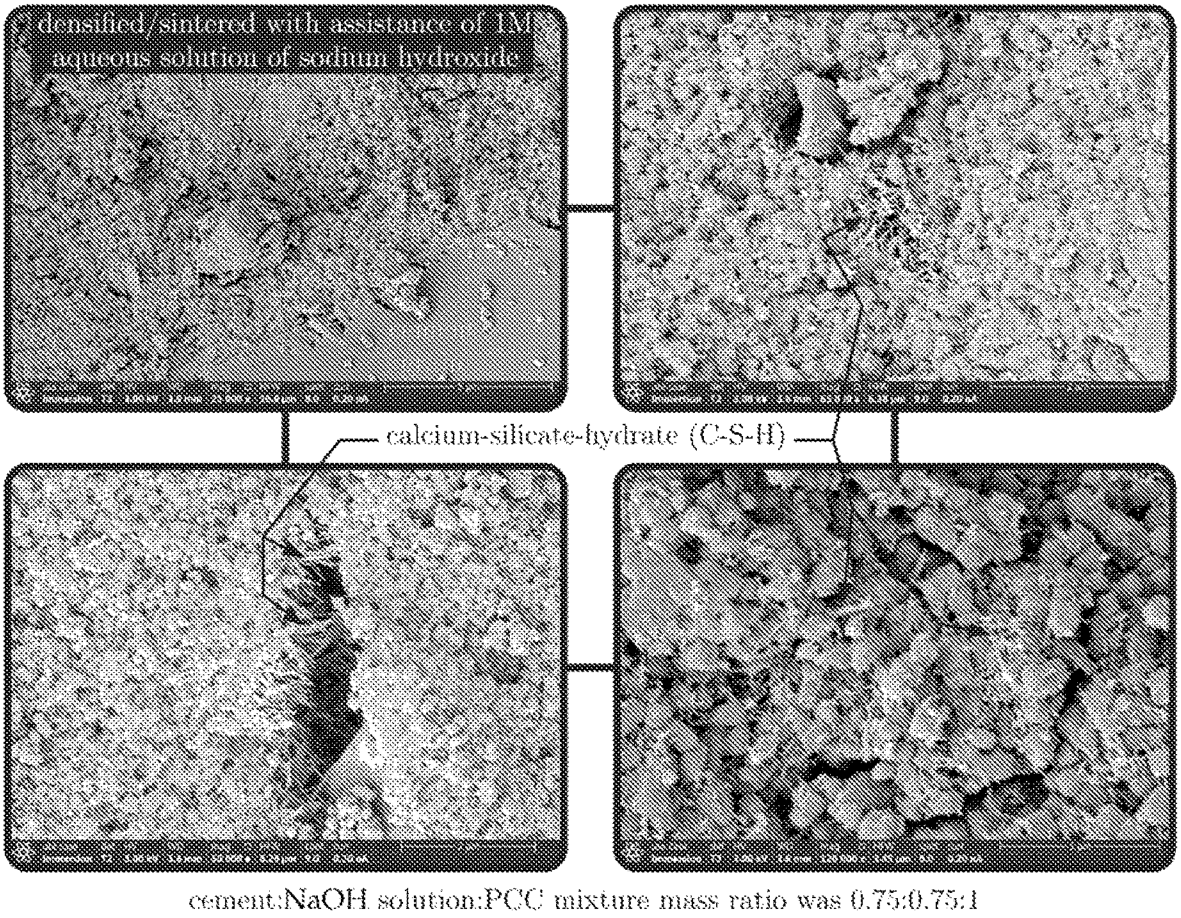
FIG. 19 shows the effect of ordinary portland cement (OPC) on densification of PCC grains.

FIG. 19 shows the effect of ordinary portland cement (OPC) on densification of PCC grains. Alkali ions $Na^+$ and $K^+$ in cement pore solutions can potentially have similar effects as that of NaOH solution in improvement of the sintering where $CaCO_3$ is supplemented with a small dose of ordinary cement. The mixture was placed in the mold after grinding for 15 minutes. Stress-temperature profile was protocol 1 (FIG. 13). The sample was immersed in water bath saturated with $Ca(OH)_2$ after the test. Isopropanol exchange was used to stop the hydration despite evaporation of most of the water content during the test. It appears that consumption of the water from NaOH solution by cement reduces sintering efficacy of the PCC grains. Smaller content of calcium-silicate-hydrate (C—S—H) was observed as a result of early water evaporation, and the hydration reactions of OPC were minimal. The obtained matrix, however, was compact upon an SEM survey of various areas across the sample. From the standpoint of OPC, there was a very low possibly for generation of portlandite ($Ca(OH)_2$), as the sintering test duration was less than one hour during which water evaporated. Portlandite generally forms after a few hours. The reaction of NaOH with the PCC might have produced small amount of $Ca(OH)_2$ (see Eq. 1.4). No signature portlandite plates were observed in SEM imaging. High stress applied was another reason that might have prohibited growth of portlandite crystals within the matrix. The low portlandite content makes the binder resistant to carbonation.

Figure 20:
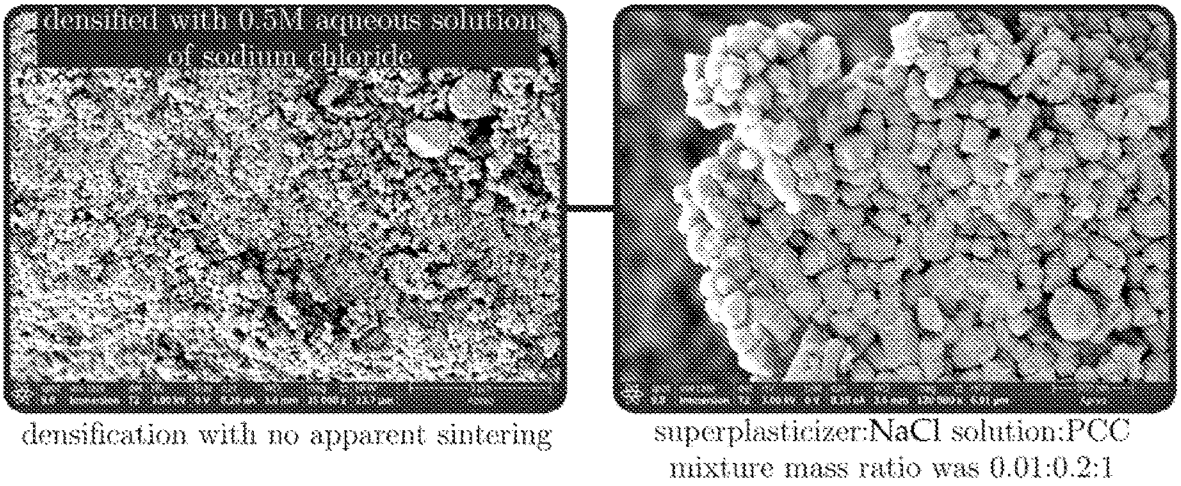
FIG. 20 shows densified PCC under high stress of 750 MPa with NaCl solution and a low dose of superplasticizer.
Figure 21:
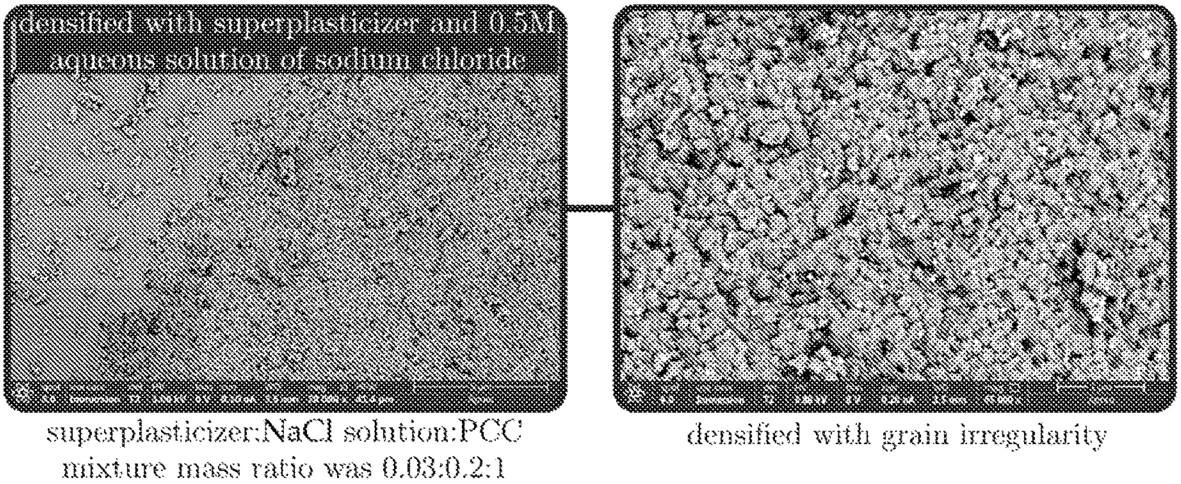
FIG. 21 shows densified PCC with NaCl solution and superplasticizer.
Figure 22:
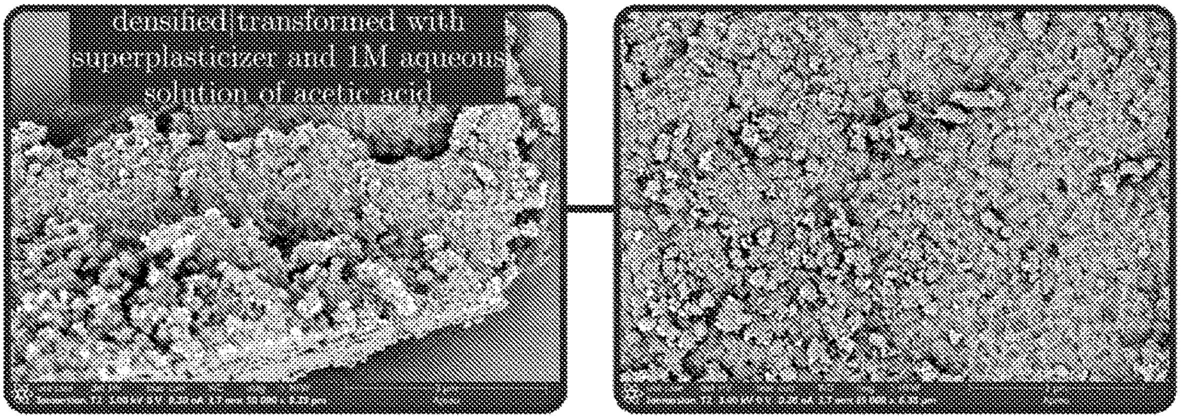
FIG. 22 shows densified PCC with acetic acid solution and superplasticizer.

In the case where the large mold with significantly larger sample mass (approx. 300×) was used, water evaporation extent within the test was lower and there was more room for generation of cement hydration products. 1M aqueous solution of NaCl and acetic acid do not seem to be as effective in sintering PCC. Superplasticizer was used in the three samples shown in FIGS. 20, 21, and 22. FIG. 20 shows densified PCC under high stress of 750 MPa with NaCl solution and a low dose of superplasticizer. FIG. 21 shows densified PCC with NaCl solution and superplasticizer. FIG. 22 shows densified PCC with acetic acid solution and superplasticizer. Its higher dose in the latter two is believed to cause a more homogeneous access of the solution to $CaCO_3$ particles, and lead to high densification. Additionally, easier grinding using the mortar and pestle when a large dose of superplasticizer is present can contribute to the grains deformation. Superplasticizer addition, nevertheless, did not help regular grain boundary development when compared to the PCC sample with NaOH solution only. Low superplasticizer dosage did not lead to PCC grain deformation observed in samples with higher superplasticizer dosage. Also, maintenance of the ultra-high stress of 750 MPa was not effective in formation of grain boundary. The combined effect of a lower stress and a suitable solution (such as NaOH solution) with the temperature rise taking place after an existing compressive stress appears to be the most effective means in the uniaxial sintering of PCC. In the case of the sample with acetic acid, Eq. 1.3 easily develops at room temperature and mostly during the sample preparation and prior to placement in the mold, but most interior zones of the $CaCO_3$ grains are not consumed due to the low solution ratio.

Figure 23:
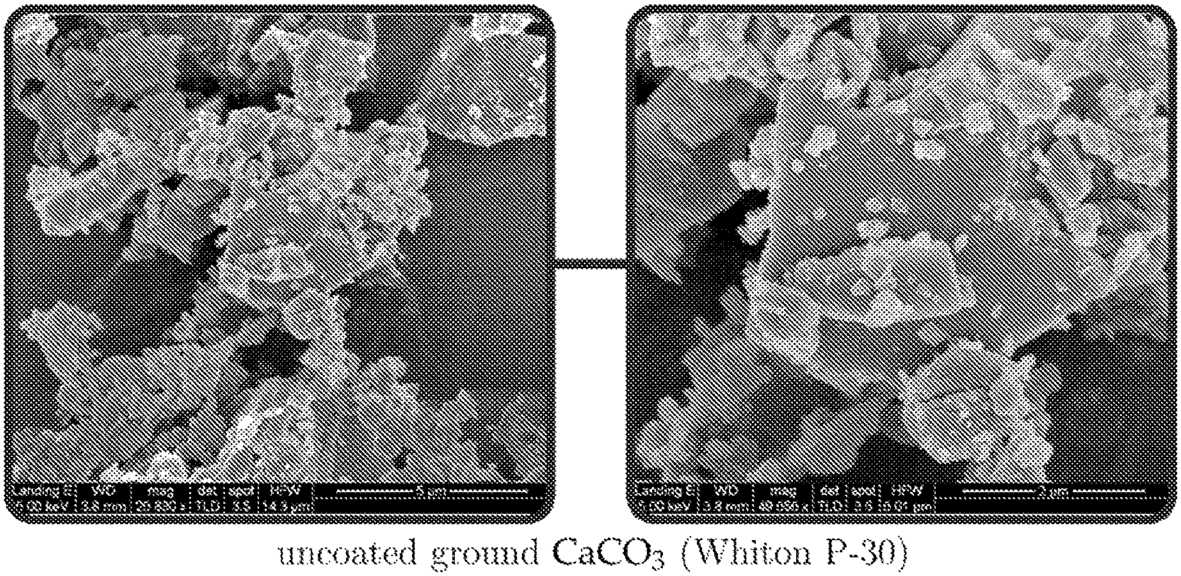
FIG. 23 shows SEM images of starting (as-received) GCC powder (Whiton P-30).
Figure 24:
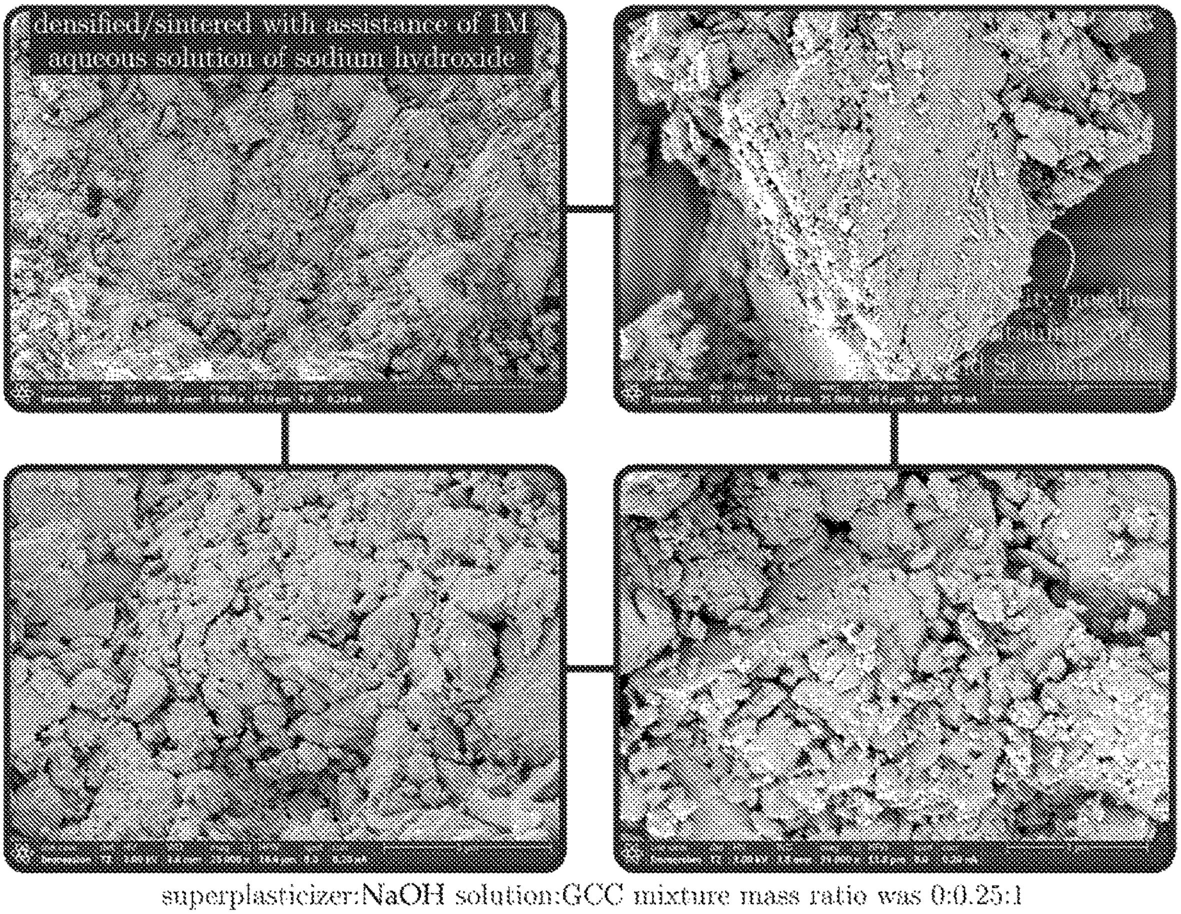
FIG. 24 illustrates lower effectiveness of NaOH solution in development of regular (straight) grain boundaries in the GCC sample when compared to the PCC sample, predominantly due to its coarser, irregular and non-uniform particle sizes.

FIG. 23 shows SEM images of starting GCC powder (Whiton P-30). FIG. 24 illustrates lower effectiveness of NaOH solution in development of regular (straight) grain boundaries in the GCC sample when compared to the PCC sample, predominantly due to its coarser, irregular and non-uniform particle sizes. Grain boundary growth was nonetheless observed in areas with smaller grains. The sample was structurally stronger than the sintered PCC sample due to its higher densification. Cheaper production of GCC makes it an attractive option, and addition of aggregates and a small supply of ordinary cement can further improve the structural soundness.

Figure 25:
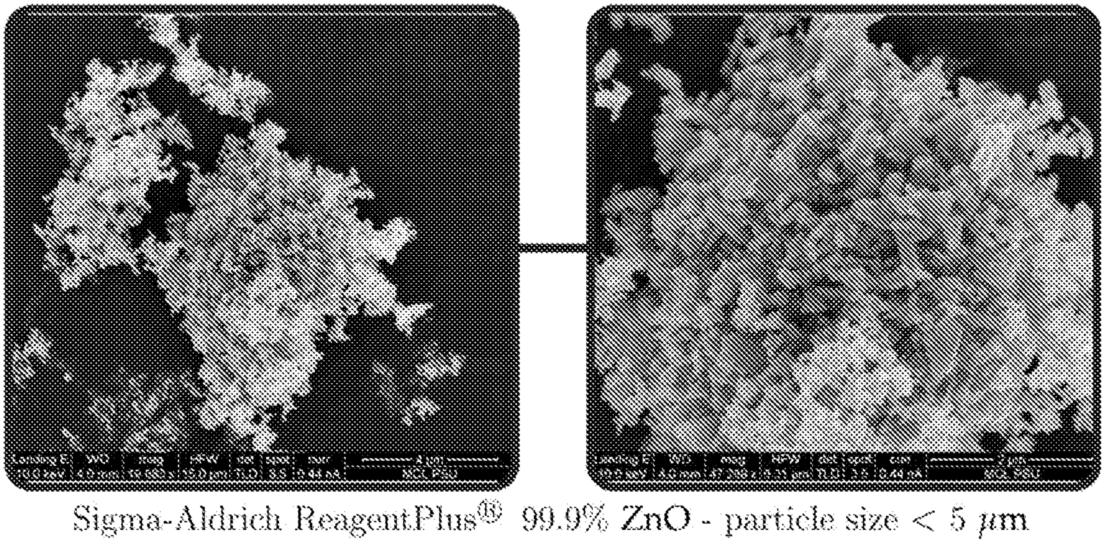
FIG. 25 illustrates the starting (as-received) ZnO powder.
Figure 26:
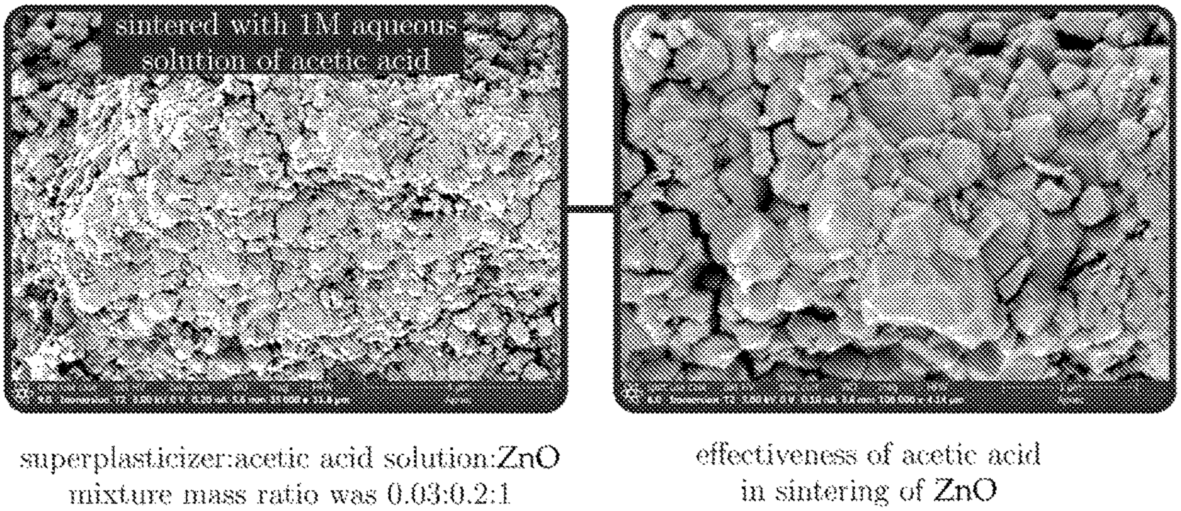
FIG. 26 shows the effectiveness of 1M acetic acid solution in sintering of ZnO.

FIG. 25 illustrates the starting ZnO powder. FIG. 26 shows the effectiveness of 1M acetic acid solution in sintering of ZnO. Its stress-temperature profile is protocol 4 (i.e., initial stress of 480 MPa with decreased stress of 360 MPa maintained for 30 minutes during which the temperature was raised to 200° C. within the first 15 minutes and soaked in the next 15 minutes). Similar results can be achieved with smaller sustained stresses. Superplasticizer was used to lower the solution-to-solid ratio to 0.2, but acetic acid solution without superplasticizer was adequate as the wetting agent since its crystals give sufficient adhesion to the matrix within few minutes. The utilized high stress caused the cracking along developed grain boundaries. Lower stresses can lead to similar sintering without fracture.

Figure 27A:
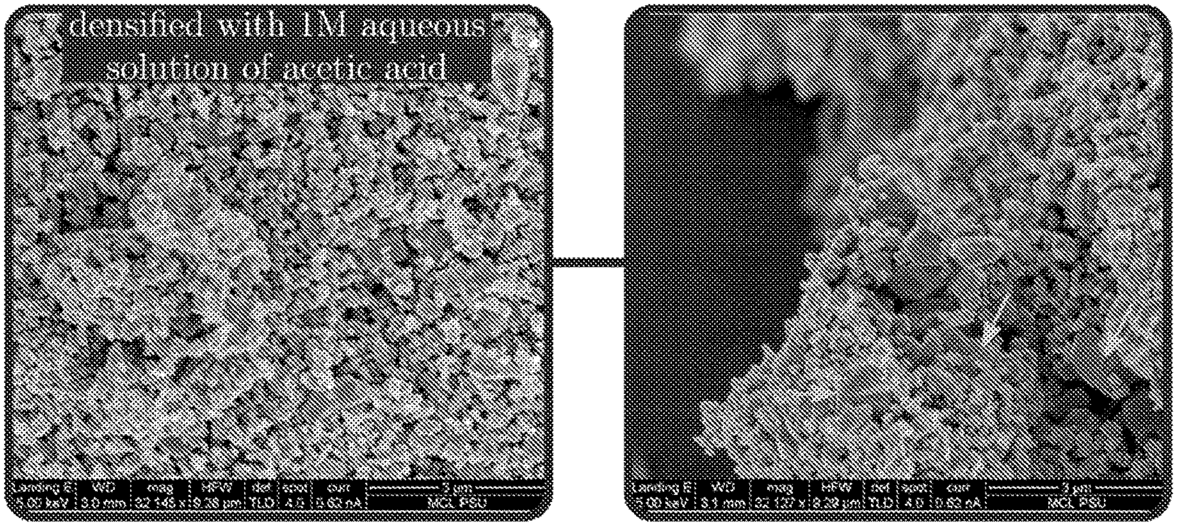
FIGS. 27A-27B show inefficacy of the sintering due to combined effect of higher degree of solution inhomogeneity in the mixture, use of the large mold and the temperature reaching its 150° C. maximum before a 280-MPa stress was sustained for 1.5 hours.
Figure 27B:
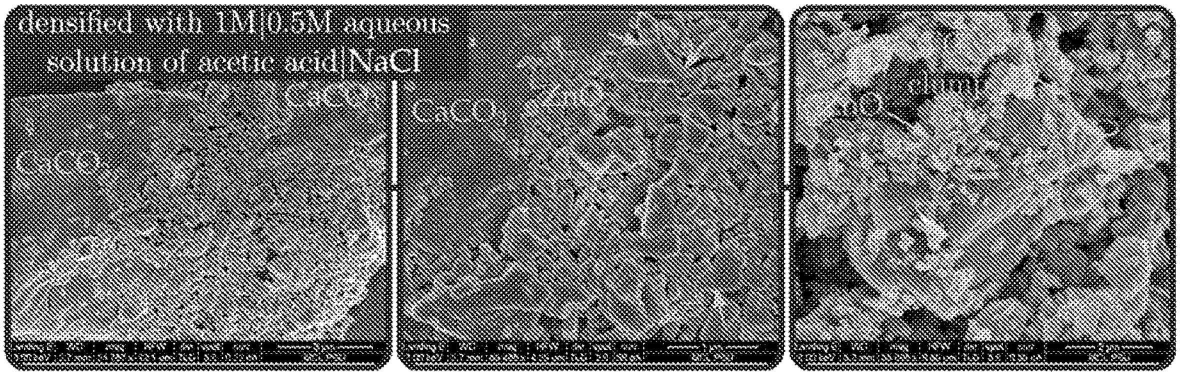

FIGS. 27A-27B show inefficacy of the sintering due to combined effect of higher degree of solution inhomogeneity in the mixture, use of the large mold, and the temperature reaching its 150° C. maximum before a 280-MPa stress was sustained for 1.5 hours.

Figure 28:
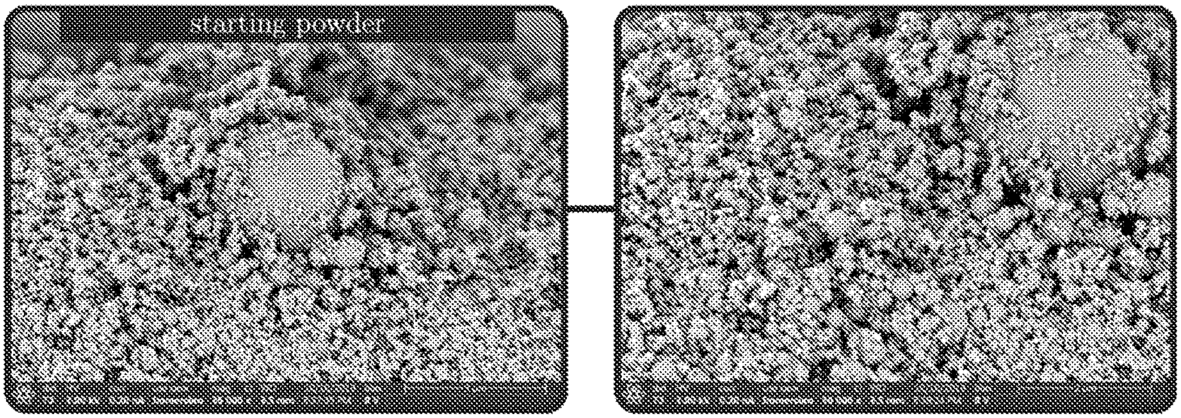
FIG. 28 shows images of the starting silica fume powder.

FIG. 28 shows images of the starting silica fume powder.

Figure 29:
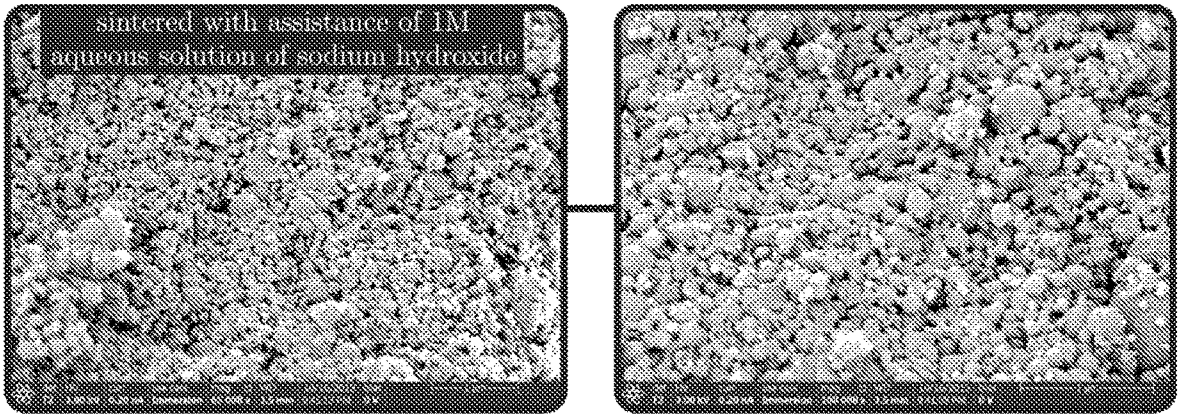
FIG. 29 shows NaOH solution being effective in partial sintering of spherical silica fume.

FIG. 29 shows NaOH solution being effective in partial sintering of spherical silica fume. A more uniform particle size distribution would perhaps have assisted in more homogeneous sintering. Mixture of silica fume with water was not effective in formation of sintered necks. The sample prepared by the NaOH has a considerably higher fracture toughness compared to the sample prepared with water when handling the samples. Silica fume can be further explored in conjunction with calcium carbonate or aluminosilicate sources such as calcined clay for desirable properties.

Figure 30:
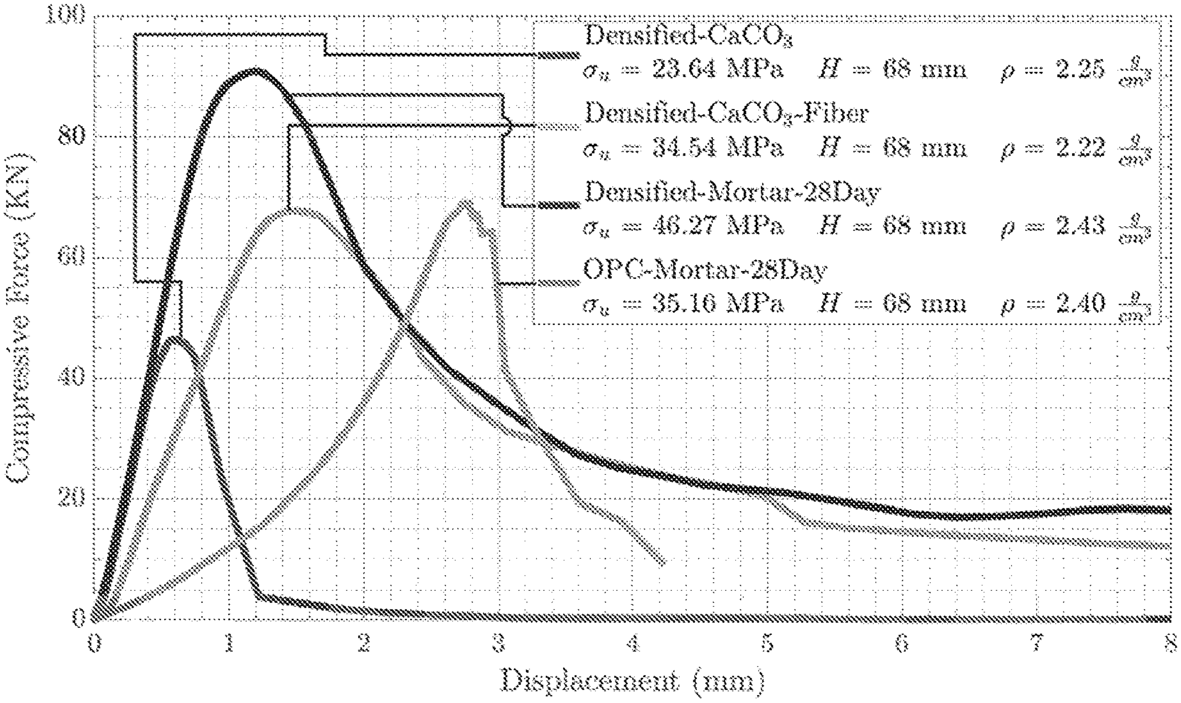
FIG. 30 shows compressive strength results of samples from the large mold.

FIG. 30 shows compressive strength results of samples from the large mold. Compressive strength of cylindrical samples with partial or full replacement of ordinary portland cement (OPC) by calcium carbonate was evaluated. A load rate of 445 N/sec was utilized. Samples with sufficient height of twice as much as the diameter were not obtained since the mold was not machined with a higher tube height. It is shown that the GCC sample sintered/densified with assistance of NaOH solution and without fiber reinforcement, having a strength of 23.6 MPa. This is promising given no parametric study including temperature and stress profiles was conducted to improve the strength. Utilization of a more thermally insulated setup with a heater providing more rapid heat density and more homogeneous sample preparation methods by mechanical mixers can capture the onset of sintering, resulting in more desirable mechanical properties that are suitable for structural applications.

Figure 31:
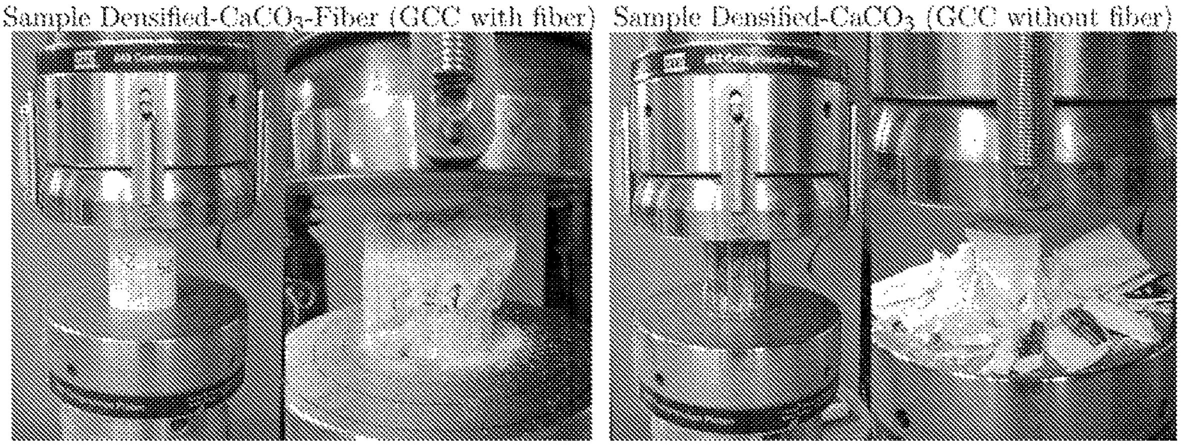
FIG. 31 shows the failure types of the samples with and without fiber inclusion sintered/densified GCC sample. Fiber inclusion enhanced the strength to 34.5 MPa.

FIG. 31 shows the failure types of the samples with and without fiber inclusion to enhance the strength to 34.51\41$^3$a in the sintered/densified GCC sample. The sample with fiber had higher post-peak capacity and ductility. NaCl solution was used in the sample with fiber. It is believed NaOH solution improves the strength slightly. The low alkalinity of the solution (1M) was not deleterious to the homopolymer polypropylene fiber utilized. The combined effect of fiber and partial replacement of $CaCO_3$ by OPC (by 16.7% only) in a sintered/densified mortar sample led to a strength of 46.3 MPa, higher than 35.16 MPa strength of the ordinary mortar. Scaling up the set-up can potentially accommodate larger aggregate sizes from which large precast blocks can be produced.

Figure 32:
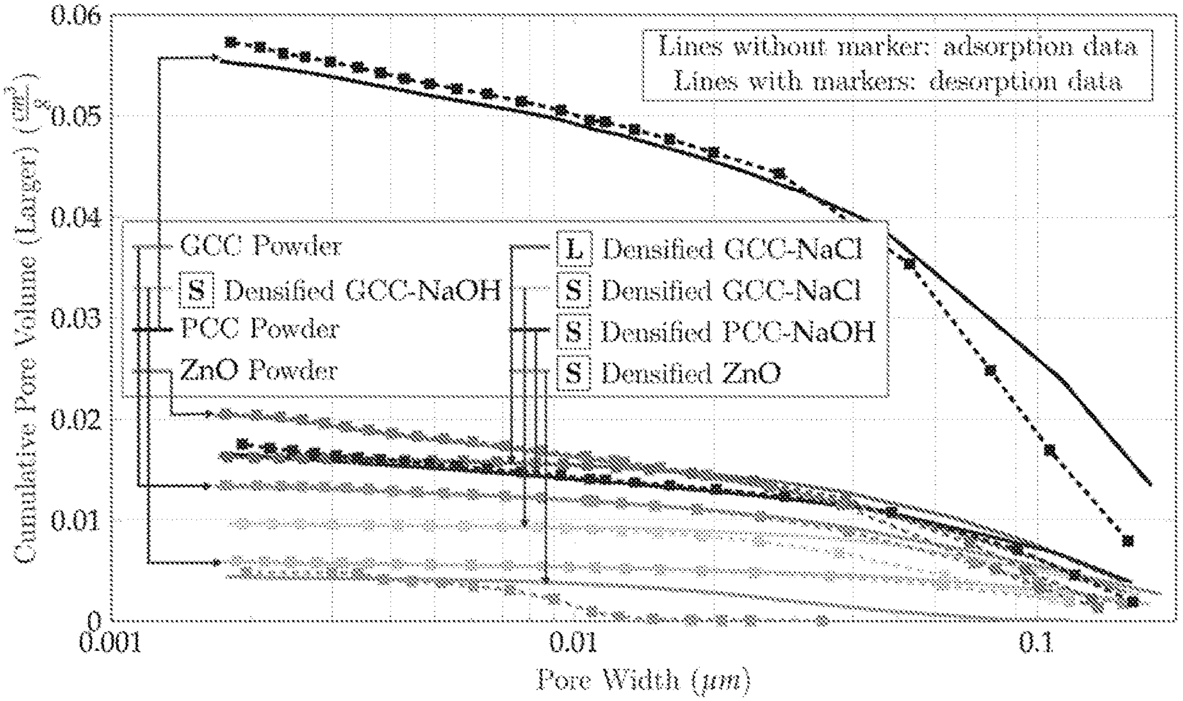
FIG. 32 shows nitrogen adsorption-desorption (NAD) porosity distribution of sintered/densified samples using adsorption or desorption isotherms.
Figure 33:
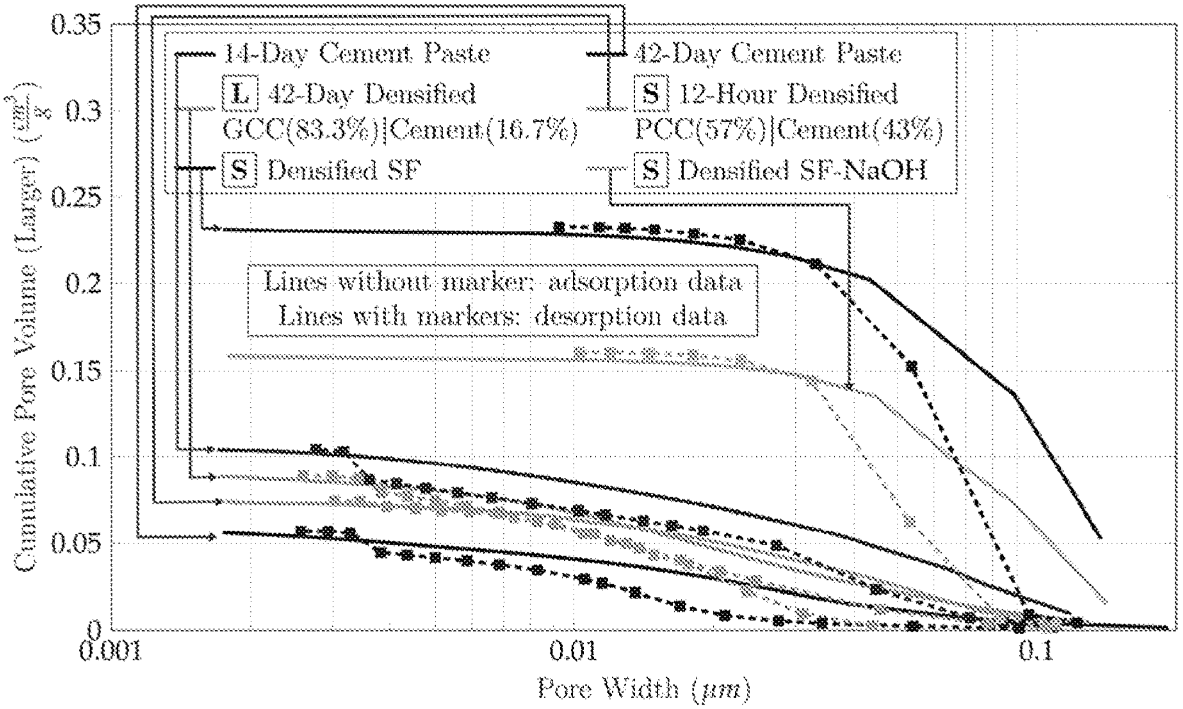
FIG. 33 shows nitrogen adsorption-desorption (NAD) porosity distribution of sintered/densified and cement paste samples using adsorption or desorption isotherms.

Nitrogen adsorption-desorption (NAD) porosity distribution of sintered/densified samples using adsorption or desorption isotherms (BJH Method with Harkins and Jura: Faas Correction) are shown in FIG. 32. L and S refer to densified samples prepared by large and small molds, respectively. FIG. 33 shows Nitrogen adsorption-desorption (NAD) porosity distribution of sintered/densified and cement paste samples using adsorption or desorption isotherms. Comparing adsorption (or desorption) data among samples, the sintered/densified GCC sample with the small mold shows significant improvement when compared to the manufacturer-processed raw GCC powder (as-received) and the sample prepared by the large mold. This is a result of a combined effect of NaOH solution, the small mold utilization, and possibly, higher stress and temperature in the former.

GCC sample prepared by the small mold and the NaCl solution have an acceptable densification as well (density: 2.32 g/cm$^3$). The GCC sample prepared by the large mold shows higher porosity across the full range of pore size compared to the raw powder. This is believed to be caused chiefly by the difficulty associated with preparing a large specimen and achieving an adequate level of homogeneity since the prepared sample mass is about 300 grams, significantly larger than the 1.5-gram sample used in the small mold.

PCC samples were prepared by the small mold only. Densification of the PCC was pronounced after sintering with NaOH solution. These samples were not as dense as the GCC samples with NaOH solution. It is believed that the grain boundary growth in the former grouped PCC grains into aggregates, leaving behind large pores. This could also be facilitated by evaporation of the solution remnants, leaving behind the pores. This, however, was not observed in the GCC samples despite irregular boundaries. The wide particle size distribution is believed to have caused their close-packing and higher densification.

As expected, the 42-day-old cement paste sample was less porous than the 14-day-old cement paste sample due to the continuous production of additional cement hydrate phases over time, the low water-to-cement ratio, and use of superplasticizer. Porosity of the 42-day-old cement paste sample can slightly decrease over time by further hydration. The 42-day-old densified sample made of 83.3% GCC and 16.7% cement as the solid content exhibited higher porosity when compared to the 42-day-old cement paste sample, due to the aforementioned causes. The 12-hour PCC sample made of 57% PCC and 43% cement as the solid content, however, had denser microstructure compared to 14-day cement paste sample. It is expected that utilization of more homogeneous sintered samples with a combination of PCC grades or finer GCC particles and cement will result in samples with higher compaction when compared to aged cement paste.

Sintering of ZnO using acetic acid solution was shown to reduce the porosity and Brunauer-Emmett-Teller (BET) surface area. This improvement is more pronounced compared to sintering of calcium carbonate samples, showing higher efficiency of acetic acid solution in sintering of ZnO than NaOH solution in sintering of calcium carbonate. The sintered ZnO had a density of 5.4 g/cm$^3$, 95% of ZnO theoretical density of 5.67 g/cm$^3$, whereas the PCC sintered with NaOH solution has 87% of calcite theoretical density. The NaOH solution is shown to be more effective in densification of silica fume when compared to the densified sample with water only. Their porosity was large compared to the 14-day cement paste. Their packing, when combined with cement and calcium carbonate can improve, enlisting them as potential additives in the binder.

Figure 34:
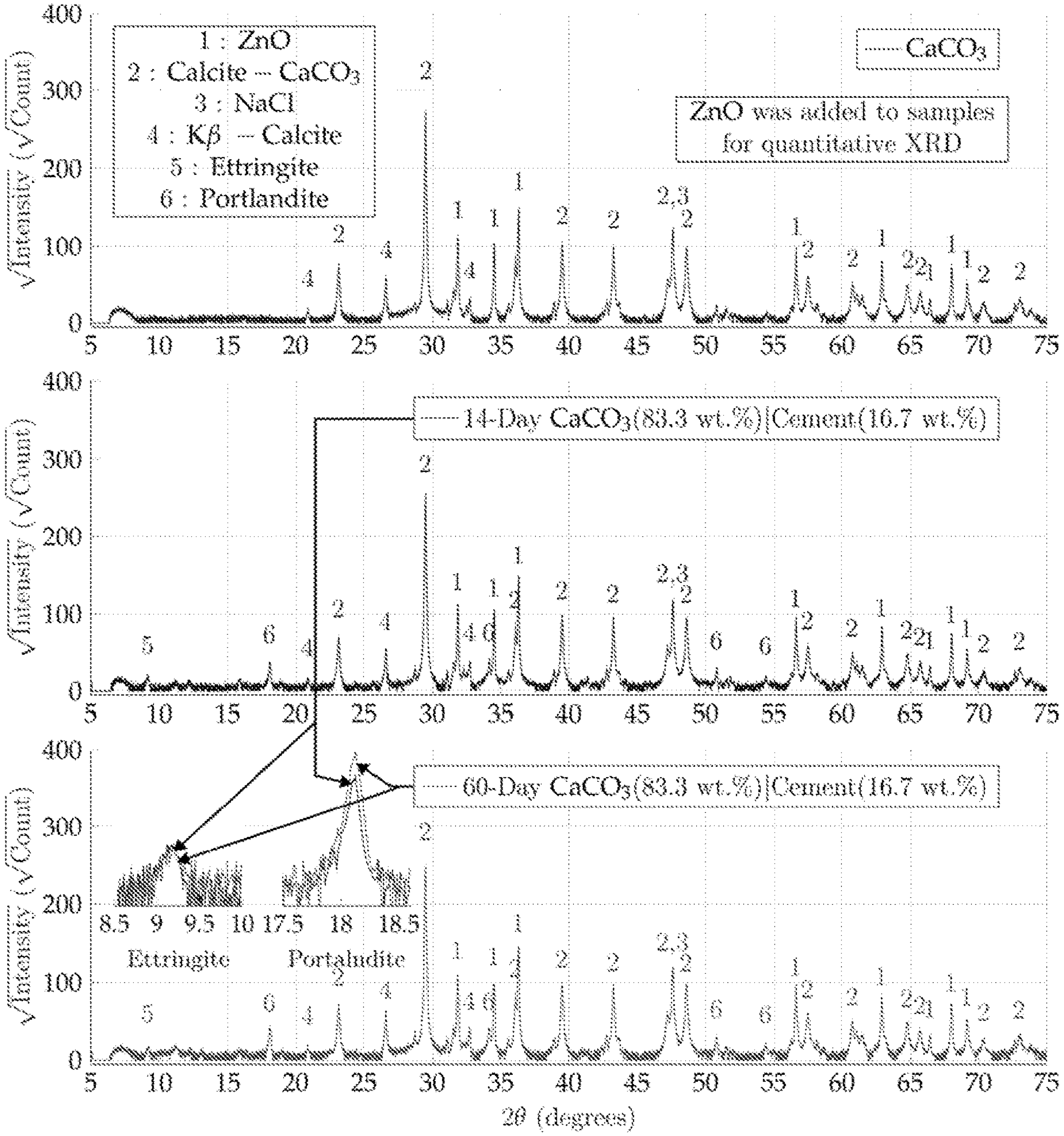
FIG. 34 shows XRD patterns of sintered pristine $CaCO_3$ and $CaCO_3$-cement samples.

FIG. 34 shows XRD patterns of sintered pristine $CaCO_3$ and $CaCO_3$ cement samples. GCC was used for the mixtures. ZnO was added to the samples with the original intend of quantitative comparison. Quantitative XRD was not feasible due to absence of a K$\beta$ filter. Intensity of maximum ZnO peak of samples were matched for qualitative comparison. As illustrated in the plots in FIG. 34, grinding the sample using mortar and pestle did not form new crystalline phases of calcium carbonate and the only phases detected were the as-received calcite. The portlandite content increased at 60 days when compared to the 14-day content in the sintered GCC sample that contained 16.7 wt. % in its mix. Further hydration of the cement and storage of the sample in a water bath saturated with $Ca(OH)_2$, preventing leaching of portlandite, caused the higher portlandite content. Ettringite remained mostly unchanged. $CaCO_3$ appeared to be fully inert to the cement hydrate phases as the cement content was low. A higher cement content would have produced additional monosulfoaluminate (AFm) at 60 days, more than those at 14 days, and initiated reaction with $CaCO_3$, producing more ettringite.

Figure 35:
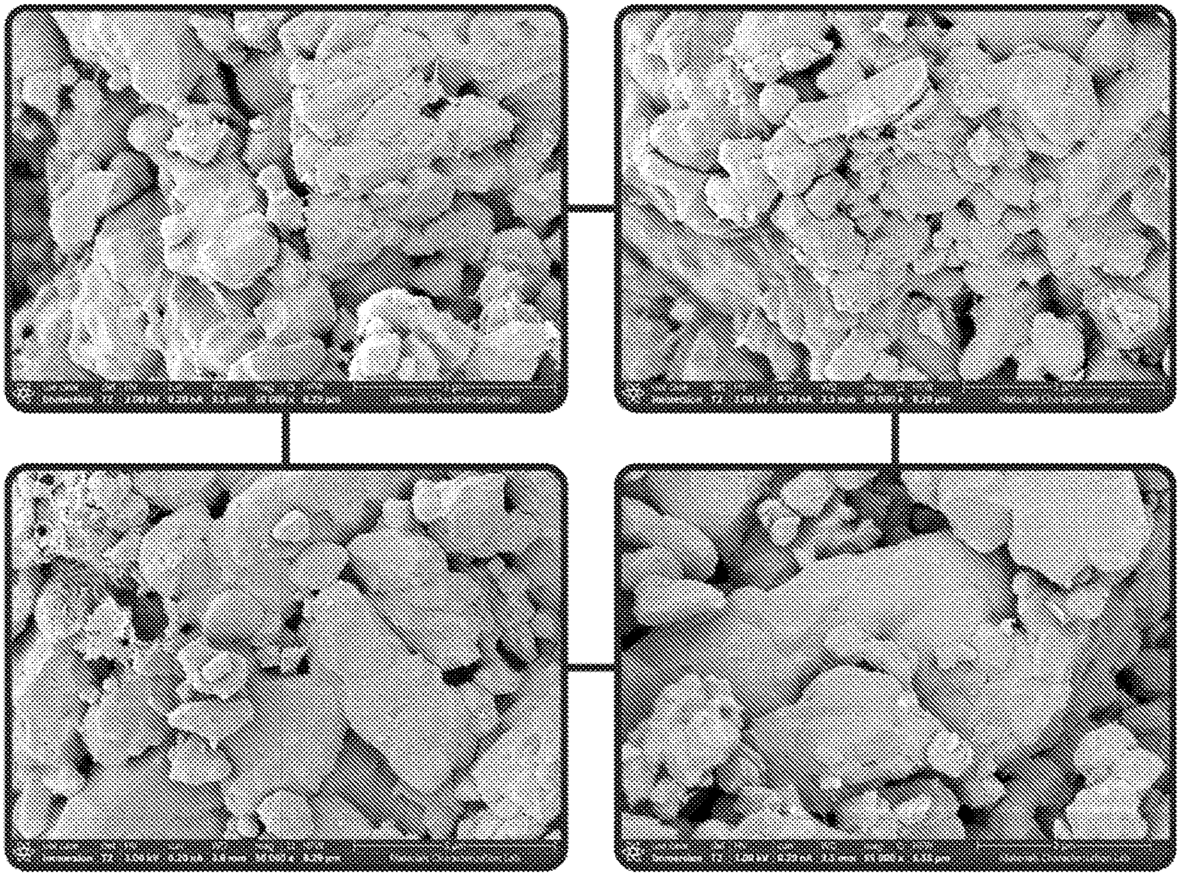
FIG. 35 shows the effect of CIP and heat treatment resulting in slight improvement in sintering of GCC.
Figure 36:
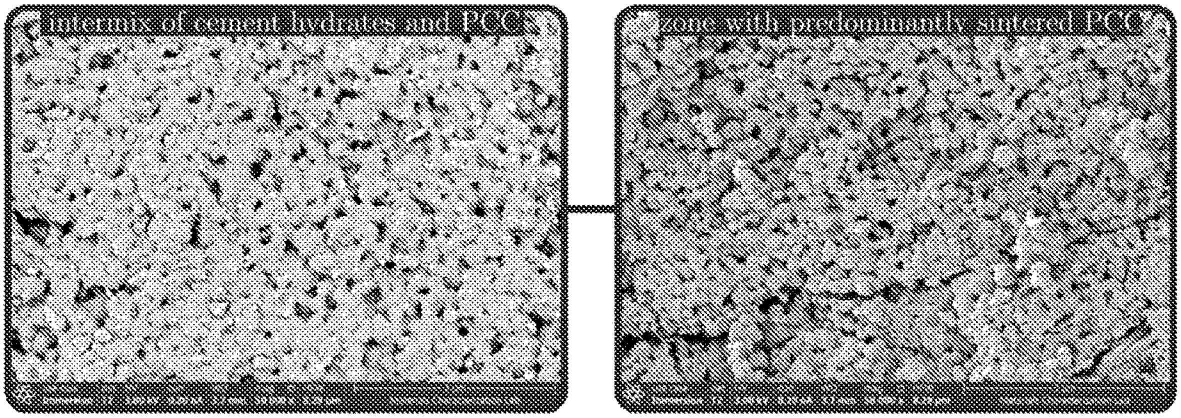
FIG. 36 shows PCC1 samples after CIP and heat treatment.

The cold sintered samples subjected to CIP under the isostatic stress of 410 MPa did not show dimensional changes. It is believed that the initial cold sintering under the uniaxial stress of 200 MPa densified the samples to the ultimate state obtainable by the combined effect of moderately high stresses and low temperatures. FIGS. 35 and 36 show the GCC and PCC samples subjected to CIP and heat treatment, respectively. The former appears to achieve slight enhancement in formation of the grain boundaries when compared to the sample cold sintered only. Coalescence of PCC appears to be more pronounced compared to the sample cold sintered only where intermix of the cement hydrates and PCC is more prevalent. This is believed to be caused by the heat treatment for 30 minutes.

Figure 37:
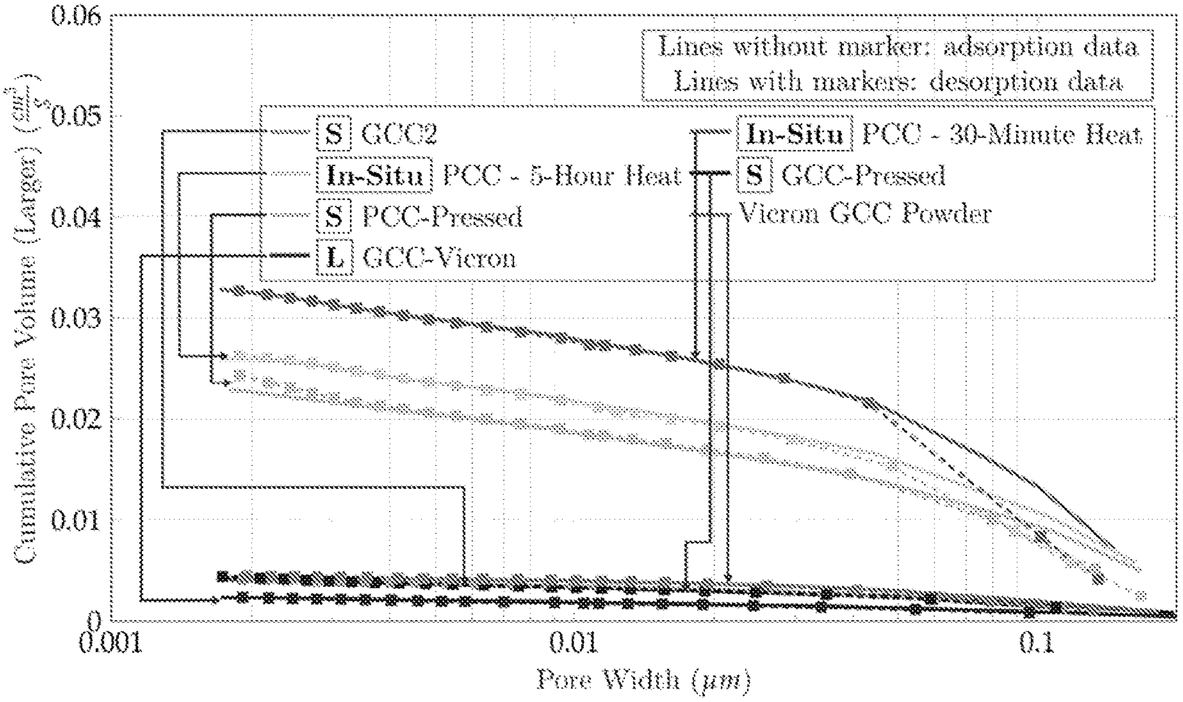
FIG. 37 shows nitrogen adsorption-desorption (NAD) porosity distribution of sintered/densified samples subjected to CIP and/or heat treatment.
Figure 38:
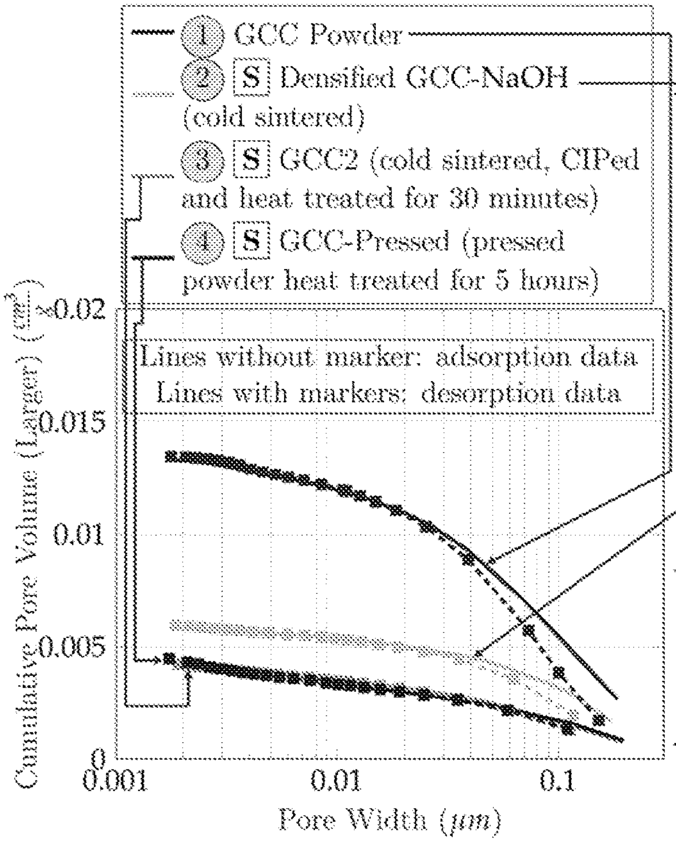
FIG. 38 shows a nitrogen adsorption-desorption (NAD) porosity distribution and BET surface area of starting GCC powder, a cold sintered sample, a cold sintered sample with post CIP-heat treatment, and a pressed sample.

FIG. 37 shows nitrogen adsorption-desorption (NAD) porosity distribution of sintered/densified samples subjected to CIP and/or heat treatment. The results of the starting GCC powder and GCC samples subjected to cold sintering, post CIP-heat treatment and pressed with post heat treatment are plotted together in FIG. 38. It is shown that CIP and heat treatment for 30 minutes (sample 3) reduced the surface area and the porosity when compared to sample that was cold sintered only (sample 2). Long heat exposure for 5 hours (sample 4) reduced the porosity but was not as effective to lower the surface area. CIP of the In-Situ sample, constituting PCC and cement, followed by heat treatment lowered the surface area away from cementitious samples and closer to the sintered/densified PCC samples. Porosity and surface area of the densified sample with Vicron as GCC, prepared by the large mold and subjected to CIP and heat improved compared to Vicron GCC starting powder. Lower surface area of Vicron GCC compared to the starting Whiton P-30 GCC was reflected in the former's coarser particle size distribution. Generally, it is observed that CIP and heat treatment improved the porosity and the surface area.

Figure 39:
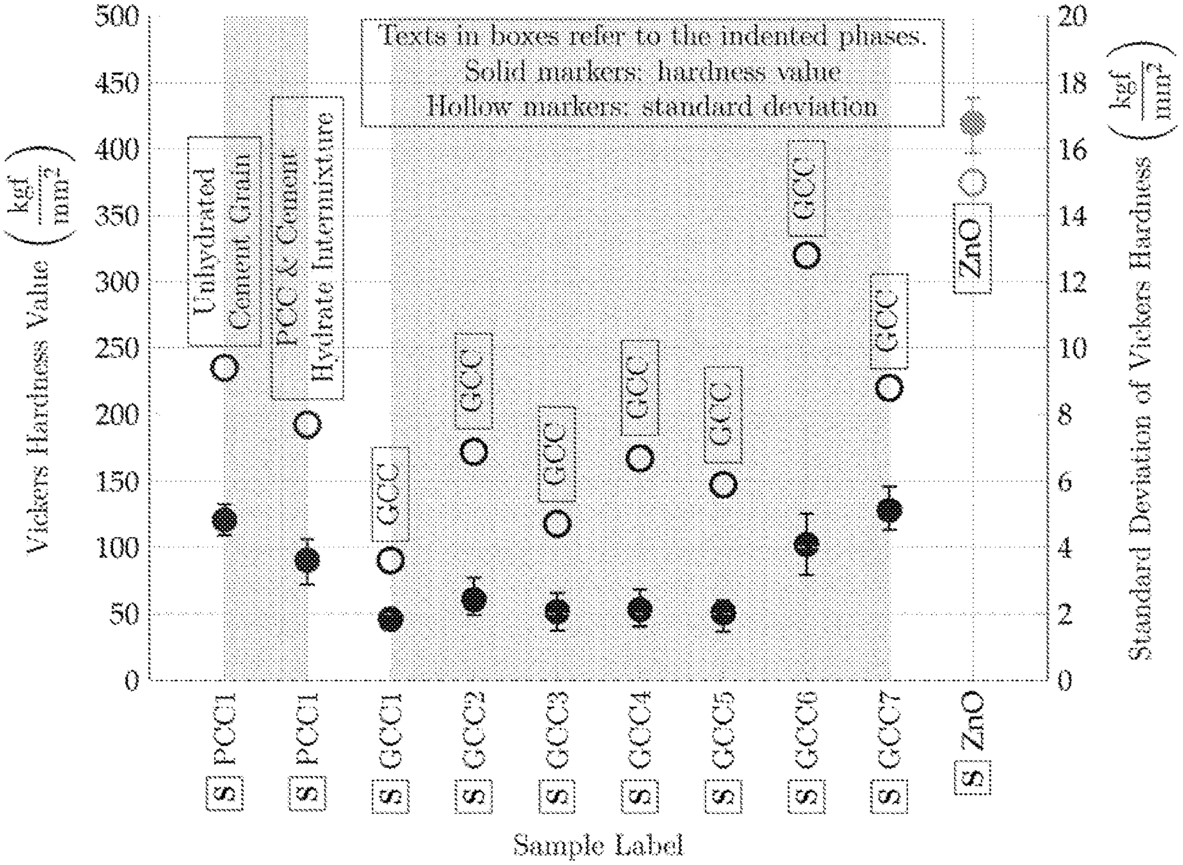
FIG. 39 shows Vickers hardness values obtained from microindentation tests.

FIG. 39 illustrates the average and error bars for the hardness values. In sample PCC1, made of PCC and cement, the unhydrated cement grains exhibited hardness higher than those of the intermix of PCC and the cement hydrates. However, the GCC samples, without cement, showed lower hardness values compared to those of the sample PCC1. It is believed the cement hydrates provided more hardness in the latter. Nevertheless, from experience working with samples made of this specific PCC with or without cement, the sintered PCC samples showcased lower fracture toughness compared to the sintered GCC samples, irrespective of the utilized CIP and heat treatments. This was caused by the larger pore size distribution of samples with PCC compared to those with GCC.

Comparing the samples with GCC only under the sample stress-temperature profile of P1 (samples GCC1 to GCC5), the hardness values were in close proximity. A combined effect of higher solution content and use of NaOH solution in the cold sintering of sample GCC2 followed by its heat treatment appears to have weakly improved the hardness compared to the other four samples. Utilization of higher uniaxial compressive stress (750 MPa of Protocol P2 compared to 200 MPa of Protocol P1) and longer heat exposure in the cold sintering stage strongly improved the hardness, as shown for samples GCC6 and GCC7 in FIG. 39. Comparing samples GCC6 and GCC7, the former, exposed to post heat treatment for 30 minutes surprisingly showed lower hardness values. This could have resulted from variations in the sample preparation procedures. It appears that post heat treatment, at least for short periods, was not as effective in improvement of the hardness as it is in reduction of porosity. High performance of acetic acid solution in cold sintering of zinc oxide was reflected in the sample's Vickers hardness of 420 kgf/mm$^2$. It is believed that assistance of acetic acid solution in sintering of zinc oxide was superior to that of sodium hydroxide solution in sintering of calcium carbonate. Hardness of the sintered ZnO was higher than those of ZnO sintered at high temperatures (1.4-2.0 GPa) and comparable to 5-GPa hardness of C-axis orientated bulk ZnO.

Figure 40:
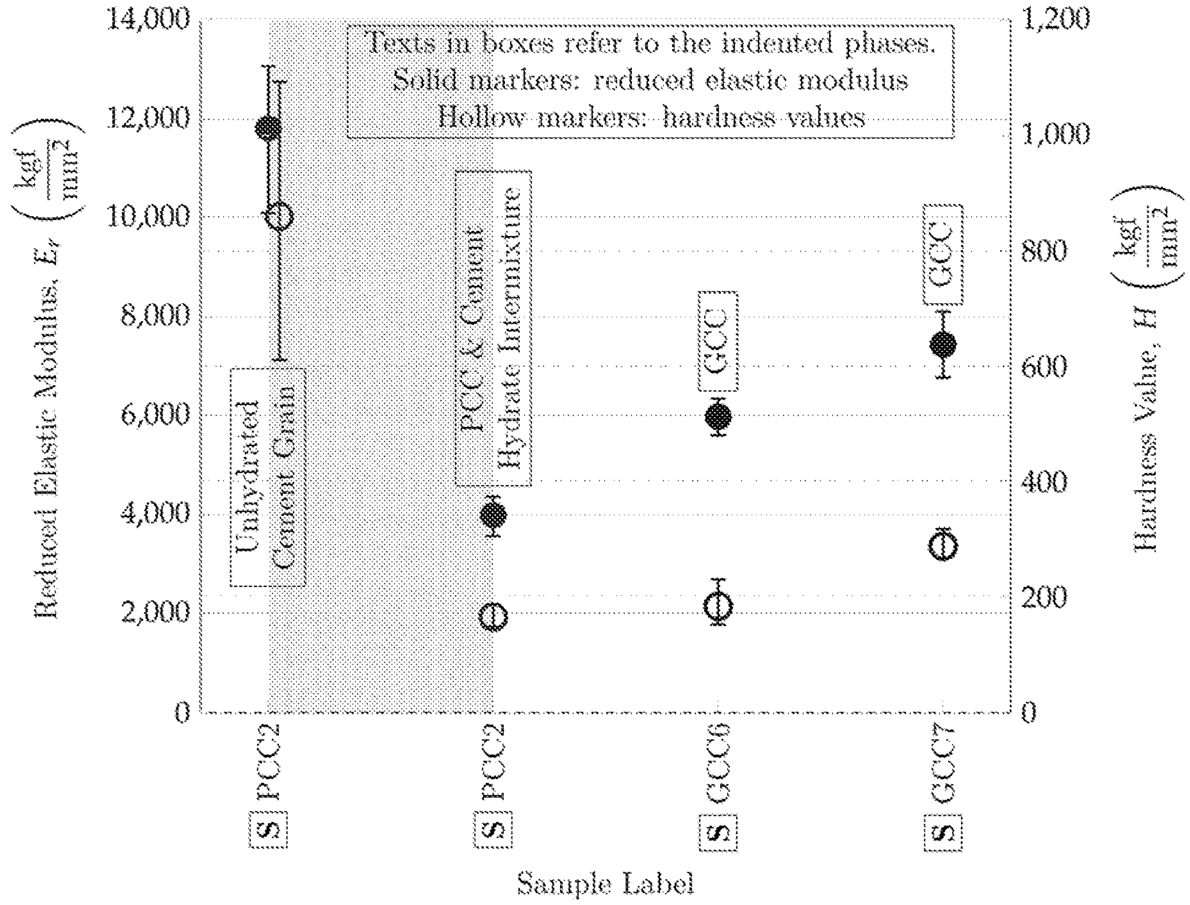
FIG. 40 shows reduced Young's (elastic) modulus (Er) and hardness (H) from the nanoindentation tests.

Reduced Young's (elastic) modulus (Er) and hardness values (H) from the nanoindentation tests are shown in FIG. 40. Higher hardness of unhydrated cement grain in sample PCC2 compared to those of the intermixture of PCC and cement hydrates is consistent with the Vickers microindentation results. For a homogeneous sample, it is expected for the Vickers hardness to be in close proximity with the hardness obtained from nanoindentation test with Berkovich tip. It is, however, observed that the average Berkovich hardness of unhydrated cement grain (860 kgf/mm$^2$) was higher than the average Vickers hardness (120 kgf/mm$^2$). Large indent size/depth in the Vickers test caused this and lowered the hardness by inclusion of the intermixture of PCC and cement hydrates surrounding and underneath of the cement grains. Therefore, the Berkovich hardness is a more representative value for the cement grain. This effect was less pronounced between Vickers and Berkovich indents on the intermixed phase, with average hardness of 90 and 165 kgf/mm$^2$, respectively. It is shown that the nanoindentation hardness of GCC6 and GCC7 samples were consistent with microindentation results discussed earlier.

Summary:

Cold sintering of commercially available ground and precipitate calcite grains was investigated. Zinc oxide was used for comparison, and cement and fiber were used to evaluate their potential impact on mechanical properties. A small and a large mold were used to compare effectiveness of the sample preparation and homogeneity of the powders wetted by water or aqueous solutions of NaOH, NaCl or acetic acid. NaOH solution excelled in sintering of grains of PCC and GCC whereas acetic acid outperformed in sintering of zinc oxide. The small mold was shown to outperform the large mold as the former's sample volume requirement was considerably lower, allowing higher control over sample preparation and homogeneous access of the wetting agents to the solid particles. More sophisticated mixing equipment can facilitate scaling up the compacts.

Stacked layers of samples can potentially be formed upon sample removal from the molds as a result of factors such as high stress on the sample in the confined uniaxial mold, sample restraint to the inner face of the tube and its crack upon contraction by cooling of the mold to room temperature, high stress loading/unloading rates, and insufficient/inhomogeneous access of solid particles to the aqueous solution. The formation of stacked layers can easily be avoided by selection of suitable and sufficient solution and acceptable loading and unloading rates.

Acquiring precast blocks with adequate bond formation through sintering at low temperatures required low solution content compared to solid constituents. The high-range water-reducing admixture (superplasticizer) helped in the initial mixing of the $CaCO_3$ and ZnO samples by providing a workable mixture while maintaining the low starting solution ratios. This workable mixture needed to be elevated in viscosity nonetheless for it to not escape within the mold gap during the sintering stage. For this purpose, a secondary material was typically needed. Depending on the goal of the final compact, this material could range from cementitious materials, aggregates or fibers to supplementary cementing materials such as silica fume. Clay minerals such as the c group have high water absorption capacity and can be explored as well. In the case of ZnO, acetic acid solution was adequate as its crystals gave sufficient adhesion to the matrix within few minutes.

Figure 41:
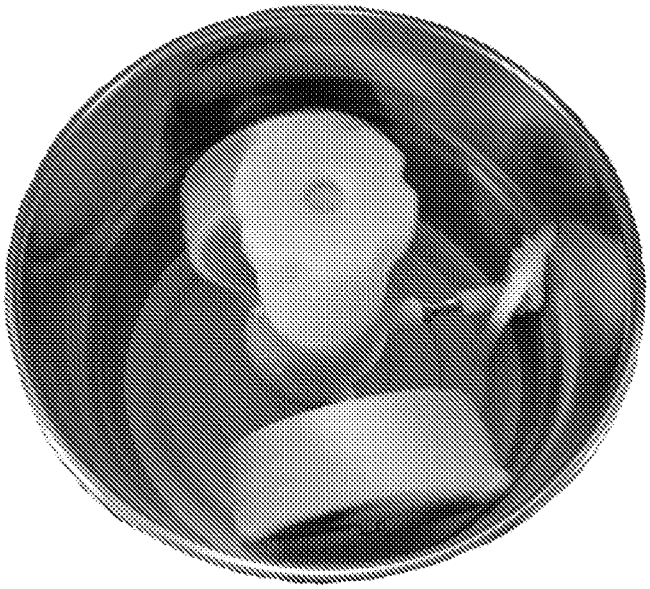
FIG. 41 shows a stone grinder that can be used in mixing of starting powder at higher water content.

Reach of water or other liquid mediums utilized in cold sintering to the solid particles and a more homogeneous mixture have been reported in literature to be easily achievable despite low water/solid ratios such as 0.2. This is leveraged when working with small sample volumes. This homogeneity, however, plays out to be more challenging to obtain in larger samples, as shown in this study by electron microscopy images and porosity measurements. One alternative could be through initial grinding at higher solution/solid ratios using tools such as stone grinders with subsequent solution content reduction. Admixtures or materials with thixotropic property can also be explored. FIG. 41 shows a stone grinder that can be used in grinding of starting powder at higher water content.

Cold isostatic pressing (CIP), by application of high pressure and temperatures as high as 120° C., is another alternative or supplement to obtain densities close to the maximum theoretical density. In contrast to the uniaxial setup utilized in this study, it applies pressure from all faces, leading to higher densification. Hot isostatic pressing (HIP) can further minimize isolated microstructural pores of metallic and ceramic materials by simultaneous/spaced heat and pressure. For ceramics, it needs a sintered compact at very high density prior to HIP to further the densification while there is higher flexibility in starting porosity of metallic samples. Its application in large-scale production, however, might be cost prohibitive.

GCC, by the virtue of its low production cost and desirable sintering/densification observed in the SEM and the porosimetry studies can be explored by various additives. Calcium carbonate can be supplemented with small doses of ordinary cements and mineral additives to further improve the mechanical properties. As in conventional quasi-brittle construction materials often requiring reinforcements, fibrous reinforcements can enhance the mechanical properties. It was shown that fiber improved the compressive strength of densified GCC while the addition of sand as aggregate and cement further enhanced the strength. The goal of the cold sintering is to utilize abundant or low-cost raw materials such as limestone and calcined clay as the major constituents (more than 80 weight %) of the binder whereas the remaining constituents such as cement and fiber are expected to give additional structural integrity that might be needed for a specific application such as masonry blocks.

Aggregates can be present as the major constituents (as high as 80 weight %) of the block similar to conventional construction materials.

Conclusions

A study was conducted to evaluate suitability of cold sintering to produce precast blocks made of calcium carbonate (a primary source of ordinary cement production) for construction material applications such as masonry units, drywall sheets, countertop materials similar to marble or architectural stone. Direct utilization of raw materials such as calcium carbonate was of particular interest as it has such benefits as: 1) reduction in 5-8% global carbon dioxide ($CO_2$) associated with cement production; 2) reduction in the consumed energy in production of conventional materials such as cement (therefore, concrete and concrete masonry units) and conventional bricks that usually require temperatures above 1000° C.; and 3) low maintenance and equipment requirement associated with cold sintering techniques, and in particular with regards to use of local materials in remote areas and on other planets to construct building blocks. Grain boundary formation, porosity, compressive strength, and hardness of samples were evaluated. The following items were concluded.

It was shown that, with assistance of suitable solutions such as aqueous solution of NaOH with low molarity, cold sintering of calcium carbonate grains is achievable with grain boundary formation. Use of the solution also produced a resultant sintered ceramic material with a low porosity. It is believed this occurred via supersaturation of the compressed contact zones between the grains by solution vapor upon heating the mixture and growth of grain boundaries under the compression.

Particle size distribution (PSD) and solubility of raw materials utilized in cold sintering dictated selection of suitable solutions. Higher effectiveness of a NaOH solution for sintering of calcium carbonate grains does not necessarily enlist it as the most suitable solution and effect of other wetting agents may be studied. During the study, cubic precipitate calcium carbonate (PCC) with a uniform PSD and the coarse ground calcium carbonate (GCC) with wide PSD were used. Yet, more round grains with narrower PSD may provide a better ceramic compound. Other solutions, such as ordinary water can be used, as opposed to NaOH.

The mixture could also be supplemented with ordinary cement at small doses for its two contributions: (1) supply of alkali ions that may assist the sintering, and (2) drawing the water into hydration reactions that may direct the water vapor away from the grains of the primary materials and help in propelling the grain boundary formation. Other materials such as supplementary cementing materials (SCMs) like ground granulated blast-furnace slag, metakaolin and silica fume may also be incorporated in cold sintering by assistance of alkali solutions. This somewhat resembles production of alkali-activated materials and geopolymers but formation of grain boundaries under compressive stress in cold sintering might enhance porosity, durability and mechanical properties of the binders that these SCMs are constituents of.

Acetic acid solution assistance in sintering of ZnO appeared to have outperformed that of NaOH solution in sintering of $CaCO_3$. It is believed that the greater effectiveness of ZnO to lower the thermodynamic Gibbs energy through formation of solid/solid bonds (between adjacent starting grains or within grains) at zones originally saturated by the solution vapors and under stress led to the better performance of ZnO.

Samples with $CaCO_3$ only and without reinforcing fibers exhibited a compressive strength of 23.6 MPa whereas the addition of the fibers improved the strength to 34.5 MPa. A mortar sample with its binder mostly composed of calcium carbonate and the rest (16.7 weight %) composed of cement exhibited a 46.3 MPa strength when the fibers were added.

Heat treatment of $CaCO_3$ samples at 550° C. improved the porosity. Thus, the compacts obtained from cold sintering can be heat treated at higher temperatures to improve their durability.

Results indicate that the hardness of unhydrated cement grains was higher than those of GCC or the intermix of PCC and cement hydrates from cold sintered samples. Higher compressive stress applied during the cold sintering, however, improved the GCC hardness values to be close to the unhydrated cement grains.

Cold sintering can be used to scale up production of construction materials blocks. Ground raw materials for conventional bricks are formed by low compressive stresses and fed into high-temperature kilns. Concrete masonry units (CMU), however, are formed by similar low compressive stresses but cured at low temperatures since ordinary cement hydration provides binding for CMU constituents. Cold sintering falls between the two in terms of the temperature requirement without the embodied energy associated with kiln operation or amount of cement used. A schematic of an exemplary process for automated production through cold sintering is illustrated in FIG. 42. The compressive stress application precedes the heat exposure in this setup and the sequence appears to be the most economical one. If sufficiently high stresses are applied and suitable wetting agents are used, it is expected that grain boundary growth could still take place despite asynchronous heat and compressive stress exposures. Alternatively, the mold assembly can be placed inside of the oven and simultaneous heat and stress be applied at higher stress dwell times. This could potentially impose higher costs.

A combination of calcium carbonate or other raw materials and less than 20 weight % of ordinary cement or other hydrating cementitious materials can also be used. Aggregates can still be used at high weight ratios similar to ordinary concrete, CMU and mortar.

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible considering the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof.

It should be understood that modifications to the embodiments disclosed herein can be made to meet a particular set of design criteria. Therefore, while certain exemplary embodiments of the system and methods of using and making the same disclosed herein have been discussed and illustrated, it is to be distinctly understood that the invention is not limited thereto but may be otherwise variously embodied and practiced within the scope of the following claims.

What is claimed is:

1. A method of forming a sintered composite, the method comprising:

combining raw material compounds with an aqueous solution to form a mixture, the raw material compounds including ground calcium carbonate and/or precipitate calcium carbonate mixed with cementing materials; and applying pressure and/or temperature to the mixture to cause the raw material compounds to sinter and generate a sintered material, wherein sintering involves supersaturation of compressed contact zones between grains of the raw material compounds.

2. The method of claim 1, wherein the raw material compounds are in powder form.

3. The method of claim 2, wherein the raw material compound has a uniform particle size distribution.

4. The method of claim 2, wherein the raw material compounds have non-uniform particle size distributions.

5. The method of claim 1, wherein the pressure is applied within a range from 10 to 300 MPa.

6. The method of claim 1, wherein the temperature is applied within a range from 50 to 250° C.

7. The method of claim 1, wherein the cementing materials include Portland cement, calcined clay, silica, and/or clay minerals.

8. The method of claim 1, wherein the aqueous solution comprises any one or combination of aqueous sodium hydroxide (NaOH) solution or aqueous sodium chloride (NaCl).

9. The method of claim 1, further comprising:

forming a precast block or a building unit from the sintered material.

10. The method of claim 9, wherein:

the precast block includes the raw material compounds, one or more supplemental additives, and fiber;

wherein the precast block is formed as a block, a brick, a tile, a masonry unit, a drywall sheet, a countertop material, or an architectural stone.

11. The method of claim 10, wherein the binder is-includes a cement pore solution.

12. The method of claim 10, further comprising:

adding aggregate to the block.

13. The method of claim 1, further comprising:

adding a supplemental additive to the mixture to any one or combination of:

provide alkali ions during sintering; and draw water of the solution into hydration reactions to direct water vapor away from grains of the raw material compounds.

14. The method of claim 13, wherein the alkali ions comprise any one or combination of sodium ions ($Na^+$) and potassium ions ($K^+$).

15. The method of claim 13, wherein the supplemental additive is any one or combination of cement pore solution, calcium hydroxide, and supplementary cementing materials comprising ground granulated blast-furnace slag.

16. The method of claim 1, further comprising:

heat treating the sintered material close to and less than a decomposition temperature of the raw material compounds.

17. The method of claim 16, wherein the raw material compounds include a ceramic or quasi-brittle material with calcium carbonate as a primary compound.

18. The method of claim 1, further comprising adding a superplasticizer to the mixture.

* * * * *